US011951641B2

(12) United States Patent
Onion et al.

(10) Patent No.: US 11,951,641 B2
(45) Date of Patent: Apr. 9, 2024

(54) EASILY DISASSEMBLED FOLDING KNIFE

(71) Applicant: GB II Corporation, Tualatin, OR (US)

(72) Inventors: Kenneth J. Onion, Kaneohe, HI (US); Frank Huang, New Taipei (TW)

( * ) Notice: Subject to any disclaimer, the term of this patent is extended or adjusted under 35 U.S.C. 154(b) by 0 days.

(21) Appl. No.: 18/051,795

(22) Filed: Nov. 1, 2022

(65) Prior Publication Data

US 2023/0090718 A1 Mar. 23, 2023

Related U.S. Application Data

(63) Continuation of application No. 16/842,511, filed on Apr. 7, 2020, now Pat. No. 11,491,667.

(60) Provisional application No. 62/839,341, filed on Apr. 26, 2019.

(51) Int. Cl.
*B26B 5/00* (2006.01)

(52) U.S. Cl.
CPC .................................... *B26B 5/00* (2013.01)

(58) Field of Classification Search
None
See application file for complete search history.

(56) References Cited

U.S. PATENT DOCUMENTS

| | | | |
|---|---|---|---|
| 298,115 | A | 5/1884 | Peace |
| 1,049,931 | A | 1/1913 | Smith |
| 1,182,043 | A | 5/1916 | Schless |
| 1,299,173 | A | 4/1919 | Grey |
| 1,350,251 | A | 8/1920 | Armour |
| 1,353,490 | A | 9/1920 | Pantlalek |
| 1,428,296 | A | 9/1922 | Neft |
| 1,487,655 | A | 3/1924 | Hlavecek |
| 1,667,462 | A | 4/1928 | Logan |
| 3,007,244 | A | 11/1961 | Vern |
| 3,061,927 | A | 11/1962 | Von Frankenburg |
| 3,488,843 | A | 1/1970 | Tims, Jr. |
| 3,829,967 | A | 8/1974 | Gilbert |

(Continued)

FOREIGN PATENT DOCUMENTS

| | | | |
|---|---|---|---|
| CN | 2194827 | Y | 4/1995 |
| CN | 2275020 | Y | 2/1998 |

(Continued)

OTHER PUBLICATIONS

First Office Action and Search Report (including English translation) from State Intellectual Property Office of the People's Republic of China, for Chinese Patent Application No. 201410076626.0, dated Jun. 10, 2015, 15 pages.

(Continued)

*Primary Examiner* — Hwei-Siu C Payer
(74) *Attorney, Agent, or Firm* — Klarquist Sparkman, LLP

(57) ABSTRACT

A blade assembly for a folding knife includes a blade and a bearing assembly. The blade includes a cutting portion and a tang portion. The tang portion comprises a pivot opening, a first recess, and a second recess. The bearing assembly is coupled to the blade and includes a first bearing member, a second bearing member, and a sleeve. The first bearing member is disposed within the first recess of the tang portion, the second bearing member is disposed within the second recess of the tang portion, and the sleeve extends through the first bearing member, the second bearing member, and the pivot opening of the tang portion.

20 Claims, 15 Drawing Sheets

(56) References Cited

U.S. PATENT DOCUMENTS

| | | | | |
|---|---|---|---|---|
| 4,161,818 | A | 7/1979 | Phelps | |
| 4,218,819 | A | 8/1980 | Phelps | |
| 4,233,737 | A | 11/1980 | Poehlmann | |
| 4,408,394 | A | 10/1983 | Phelps | |
| 4,730,393 | A | 3/1988 | Coburn | |
| 5,022,156 | A | 6/1991 | Kallens et al. | |
| 5,572,793 | A | 11/1996 | Collins et al. | |
| 5,594,966 | A | 1/1997 | Goldman | |
| 5,605,495 | A | 2/1997 | Jenkins, Jr. | |
| 5,661,908 | A | 9/1997 | Chen | |
| 5,737,841 | A * | 4/1998 | McHenry | B26B 1/048 30/160 |
| 5,916,277 | A | 6/1999 | Dallas | |
| 6,101,723 | A | 8/2000 | Ford | |
| 6,134,788 | A | 10/2000 | Chen et al. | |
| 6,591,504 | B2 | 7/2003 | Onion | |
| 6,751,820 | B1 | 6/2004 | Wu | |
| 6,802,126 | B2 | 10/2004 | Huang | |
| 6,865,816 | B1 | 3/2005 | Zajdel | |
| 6,942,255 | B2 | 9/2005 | Pickering | |
| 7,022,915 | B1 | 4/2006 | Galguera | |
| 7,100,285 | B1 | 9/2006 | Huang | |
| 7,134,207 | B2 | 11/2006 | Ping | |
| 7,162,803 | B2 | 1/2007 | Lu | |
| 7,246,441 | B1 | 7/2007 | Collins | |
| 7,370,421 | B2 | 5/2008 | Onion et al. | |
| 7,716,839 | B2 | 5/2010 | Onion et al. | |
| 8,051,518 | B2 | 11/2011 | Massaro | |
| 8,087,173 | B2 | 1/2012 | Tang et al. | |
| 8,499,460 | B1 | 8/2013 | Pearman | |
| 8,893,389 | B2 * | 11/2014 | Freeman | B26B 1/046 30/155 |
| 9,061,426 | B2 | 6/2015 | Harvey | |
| 9,492,916 | B2 | 11/2016 | Snyder | |
| 9,586,328 | B2 | 3/2017 | Onion | |
| 9,592,612 | B2 | 3/2017 | Koenig | |
| 9,597,809 | B2 | 3/2017 | Onion | |
| 9,943,970 | B2 | 4/2018 | Glesser | |
| 10,226,871 | B2 | 3/2019 | Huang | |
| 10,391,645 | B2 * | 8/2019 | Trull | B26B 1/04 |
| 10,759,067 | B2 | 9/2020 | Huang | |
| 11,052,549 | B2 * | 7/2021 | DeBaker | B26B 1/044 |
| 11,491,667 | B2 * | 11/2022 | Huang | B26B 5/00 |
| 2004/0139613 | A1 | 7/2004 | Onion | |
| 2005/0229401 | A1 | 10/2005 | Onion | |
| 2005/0257377 | A1 | 11/2005 | Lu et al. | |
| 2006/0272157 | A1 | 12/2006 | Zeng | |
| 2007/0011884 | A1 | 1/2007 | Hua et al. | |
| 2008/0172884 | A1 | 7/2008 | Cheng | |
| 2008/0222896 | A1 | 9/2008 | Marfione et al. | |
| 2009/0288301 | A1 | 11/2009 | Hawk et al. | |
| 2010/0177508 | A1 | 7/2010 | Maglica | |
| 2010/0281696 | A1 | 11/2010 | Hao et al. | |
| 2011/0041344 | A1 | 2/2011 | De et al. | |
| 2011/0272265 | A1 | 11/2011 | Mortun | |
| 2012/0011728 | A1 | 1/2012 | Keers | |
| 2012/0017443 | A1 | 1/2012 | Hao | |
| 2012/0124754 | A1 | 5/2012 | Frazer | |
| 2012/0234142 | A1 * | 9/2012 | Onion | B26B 1/044 30/155 |
| 2012/0272534 | A1 | 11/2012 | Lee | |
| 2013/0174351 | A1 | 7/2013 | Carson | |
| 2014/0027234 | A1 | 1/2014 | Zhou et al. | |
| 2014/0245615 | A1 | 9/2014 | Onion et al. | |
| 2014/0259686 | A1 | 9/2014 | Garavaglia et al. | |
| 2016/0029733 | A1 | 2/2016 | Kovarik et al. | |
| 2016/0031096 | A1 | 2/2016 | Koenig | |
| 2016/0059429 | A1 | 3/2016 | Mayes | |
| 2016/0075037 | A1 | 3/2016 | Ikoma | |
| 2016/0271809 | A1 | 9/2016 | Bloch | |
| 2016/0288344 | A1 | 10/2016 | Squiers et al. | |
| 2016/0311123 | A1 | 10/2016 | Schoon | |
| 2017/0334077 | A1 | 11/2017 | Onion et al. | |
| 2018/0169874 | A1 | 6/2018 | Halucha | |
| 2018/0290282 | A1 | 10/2018 | Wang | |
| 2018/0290314 | A1 | 10/2018 | Huang | |
| 2019/0118395 | A1 | 4/2019 | Cheng | |
| 2019/0202073 | A1 | 7/2019 | Huang | |
| 2019/0217488 | A1 | 7/2019 | Lo | |
| 2019/0232508 | A1 | 8/2019 | Onion | |
| 2019/0321991 | A1 | 10/2019 | Medhurst | |
| 2020/0101633 | A1 | 4/2020 | Halucha | |
| 2020/0338766 | A1 | 10/2020 | Huang | |
| 2021/0107172 | A1 | 4/2021 | Onion | |
| 2021/0299892 | A1 | 9/2021 | Chen | |
| 2023/0090718 | A1 * | 3/2023 | Onion | B26B 5/00 |

FOREIGN PATENT DOCUMENTS

| | | | |
|---|---|---|---|
| CN | 2326401 | Y | 6/1999 |
| CN | 2385854 | Y | 7/2000 |
| CN | 2456890 | Y | 10/2001 |
| CN | 1303762 | A | 4/2004 |
| CN | 2774721 | Y | 4/2006 |
| CN | 2902614 | Y | 5/2007 |
| CN | 201401419 | Y | 2/2010 |
| CN | 201471444 | U | 5/2010 |
| CN | 201500984 | U | 6/2010 |
| CN | 201544254 | U | 8/2010 |
| CN | 202943650 | U | 5/2013 |
| CN | 103909530 | A | 7/2014 |
| CN | 101659061 | B | 10/2014 |
| CN | 101733761 | B | 11/2014 |
| CN | 104260025 | A | 1/2015 |
| CN | 105500407 | A | 4/2016 |
| CN | 106042007 | A | 10/2016 |
| CN | 107214734 | A | 9/2017 |
| CN | 107379023 | A | 11/2017 |
| CN | 206633047 | U | 11/2017 |
| CN | 112265018 | A | 1/2021 |
| DE | 202008005736 | U1 | 8/2008 |
| GB | 108823 | A | 8/1917 |
| TW | 201710046 | A | 3/2017 |
| TW | I645947 | B | 1/2019 |
| TW | I732469 | B | 7/2021 |
| WO | WO 88/007918 | A1 | 10/1988 |
| WO | WO1999/000224 | A2 | 1/1999 |

OTHER PUBLICATIONS

Office Action dated Sep. 24, 2015, issued by the United States Patent and Trademark Office in U.S. Appl. No. 14/197,090, filed Mar. 4, 2014.

Office action dated Jan. 14, 2016, issued by the United States Patent and Trademark Office in related U.S. Appl. No. 14/197,120, filed Mar. 4, 2014.

* cited by examiner

EASILY DISASSEMBLED FOLDING KNIFE

CROSS-REFERENCE TO RELATED APPLICATIONS

This application is a continuation of U.S. patent application Ser. No. 16/842,511, filed Apr. 7, 2020, issuing as U.S. Pat. No. 11,491,667, which claims priority to U.S. Provisional Patent Application No. 62/839,341, filed on Apr. 26, 2019. The prior applications are incorporated by reference herein in their entirety.

FIELD

The present disclosure relates to folding knives and, more particularly, to folding knives configured to be easily disassembled.

BACKGROUND

Folding knives are available in various configurations. In some of these configurations, the blade of a folding knife can be removable to facilitate cleaning, sharpening, replacement, or storing of a blade. As examples, U.S. Pat. Nos. 7,370,421 and 7,716,839 describe a knife having a removable blade. Because folding knives having removable blades are particularly advantageous in harsh conditions (i.e., in situations where a knife is likely to become dirty or dull, and thus where the ability to clean, sharpen, or replace a blade in the field is important), it would be beneficial to provide a folding knife with a removable blade having as simple a structure as possible. Simpler configurations can help to ensure that the blade remains easily removable after use in harsh conditions and that removal of the blade can be accomplished as quickly and reliably as possible. Accordingly, simple mechanisms allowing a folding knife to be easily disassembled are desirable.

SUMMARY

The present disclosure is directed to folding knives that can be easily disassembled, such as for cleaning or replacing a blade or other components. For example, folding knives disclosed herein can be assembled and disassembled without the use of any tools (e.g., without a screwdriver, etc.). The disclosed folding knives include a handle having first and second side portions having complementary locking elements which can prevent the side portions from being separated from one another in a locked or engaged configuration and which allow the side portions to be separated from one another in an unlocked or release configuration. In some instances, the handle comprises an actuation mechanism configured for moving the locking elements between the locked and unlocked configurations.

In one representative embodiment, a folding knife includes a blade, a handle, an actuation mechanism, and a switch. The handle includes a first side portion and a second side portion. The blade is disposed between and pivotably coupled to the first side portion and the second side portion. The actuation mechanism is coupled to the handle and is movable relative to the handle between an engaged configuration and a disengaged configuration. In the engaged configuration, the actuation mechanism prevents relative movement between the first side portion of the handle and the second side portion of the handle in a first direction. In the disengaged configuration, the actuation mechanism allows relative movement between the first side portion of the handle and the second side portion of the handle in the first direction. The switch is coupled to the handle and the actuation mechanism. The switch is configured such that moving the switch relative to the handle along a first path retains the actuation mechanism in the engaged configuration and such that moving the switch relative to the handle along a second path moves the actuation mechanism between the engaged configuration and the disengaged configuration.

In some embodiments, the switch is pivotably coupled to the actuation mechanism.

In some embodiments, the actuation mechanism comprises an engaging plate with a pivot opening formed therein, the switch comprises a pivot projection configured to extend through the pivot opening of the engaging plate, and the switch pivots relative to the engaging plate about the pivot projection when the switch is moved along the first path.

In some embodiments, the engaging plate further comprises a guide slot, the switch further comprises a guide projection configured to extend through the guide slot of the engaging plate, and the guide projection of the switch traverses the guide slot of the engaging plate when the switch is moved along the first path.

In some embodiments, the first side portion of the handle comprises an engaging post extending therefrom, the second side portion of the handle comprises a post opening configured for receiving the engaging post, and the actuation mechanism secures the engaging post of the first side portion within the post opening of the second side portion when the actuation mechanism is in the engaged configuration.

In some embodiments, the second side portion of the handle comprises a first plate and a second plate, the first plate and the second plate are coupled together and form a housing, and the switch and the actuation mechanism are disposed within the housing.

In some embodiments, the first plate comprises one or more recesses configured for receiving the switch and the actuation mechanism.

In some embodiments, the first plate comprises a first recess configured for receiving the switch and for restricting movement of the switch along the second path.

In some embodiments, the first plate comprises a second recess configured for receiving the actuation mechanism and for allowing movement of the actuation mechanism along the second path.

In another representative embodiment, a folding knife includes a blade, a handle, an actuation mechanism, and a switch. The handle includes a first side portion and a second side portion. The blade is disposed between and pivotably coupled to the first side portion and the second side portion. The actuation mechanism is movably coupled to the handle and movable relative to the handle between an engaged configuration and a disengaged configuration. In the engaged configuration, the actuation mechanism prevents relative movement between the first side portion of the handle and the second side portion of the handle in a first direction. In the disengaged configuration, the actuation mechanism allows relative movement between the first side portion of the handle and the second side portion of the handle in the first direction. The switch is coupled to the handle and the actuation mechanism. The switch is configured to be moved relative to the handle between a first position and a second position with a first type of movement. The actuation mechanism is in the engaged configuration when the switch is in the first position and the second position. The switch is configured to be moved relative to the handle between the second position and a third position with a second type of movement. The actuation mechanism is in the disengaged configuration when the switch is in the third position.

In some embodiments, the first type of movement is pivoting.

In some embodiments, the switch pivots relative to the actuation mechanism when the switch is moved between the first position and the second position.

In some embodiments, the second type of movement is translating.

In some embodiments, the handle comprises a housing, and the switch and the actuation mechanism are disposed within the housing of the handle.

In some embodiments, the handle comprises one or more restricting elements configured to prevent movement of the switch between the first position and the third position.

In some embodiments, the restricting elements comprise a recess formed in the handle.

In some embodiments, the handle comprises one or more restricting elements configured to prevent movement of the switch between the second position and the third position.

In some embodiments, the restricting elements comprise a biasing mechanism coupled to the switch and the handle.

In another representative embodiment, a folding knife includes a blade, a handle, at least one engaging post, an engaging member, and a switch. The handle includes a first side portion and a second side portion. The blade is disposed between and pivotably coupled to the first side portion and the second side portion. The at least one engaging post extends laterally from the first side portion to the second side portion. The engaging member is slidable between a first position engaging the engaging post and a second position disengaged from the engaging post. When the engaging member is in the first position, the engagement of the engaging member with the engaging post resists lateral separation of the first and second side portions. When the engaging member is in the second position, the first and second side portions can be laterally separated from each other. The switch is coupled to the engaging member and is configured to move the engaging member between the first and second positions. The switch is configured to pivot relative to the engaging member from a third position to a fourth position. When the switch is in the third position, the switch can move the engaging member from the first position to the second position. When the switch is in the fourth position, the switch is blocked from moving the engaging member from the first position to the second position.

In some embodiments, one of the first and second side portions comprises a blocking feature that blocks the switch from moving the engaging member when the switch is in the fourth position.

In some embodiments, the blocking feature comprises an opening in one of the first and second side portions that is shaped to engage the switch when the switch is in the fourth position.

In another representative embodiment, a method of disassembling a folding knife is provided. The method includes moving a switch of the folding knife relative to a handle of the folding knife from a first position to a second position. The handle comprises a first side portion and a second side portion. The first side portion, the second side portion, and a blade of the folding knife remain coupled together when the switch is in the first position and the second position. The method further includes moving the switch relative to the handle from the second position to a third position, and separating the first side portion and the second side portion of the handle from the blade.

In some embodiments, moving the switch from the first position to the second position comprises pivoting the switch relative to the handle, and moving the switch from the second position to the third position comprises sliding the switch relative to the handle.

In another representative embodiment, a blade assembly for a folding knife is provided. The blade assembly includes a blade and a bearing assembly. The blade includes a cutting portion and a tang portion. The tang portion comprises a pivot opening and one or more recessed portions. The bearing assembly is coupled to the blade. The bearing assembly includes one or more bearing members and a sleeve. The bearing members are disposed within the recessed portions of the blade. The sleeve extends through the bearing members and through the pivot opening of the blade. The sleeve includes one or more flange portions configured to engage the bearing members and to retain the bearing members within the recessed portions of the blade.

The foregoing and other objects, features, and/or advantages of the disclosed technology will become more apparent from the following description, which proceeds with reference to the accompanying figures, as well as the claims and accompanying drawings.

DETAILED DESCRIPTION

General Considerations

Figure 1:
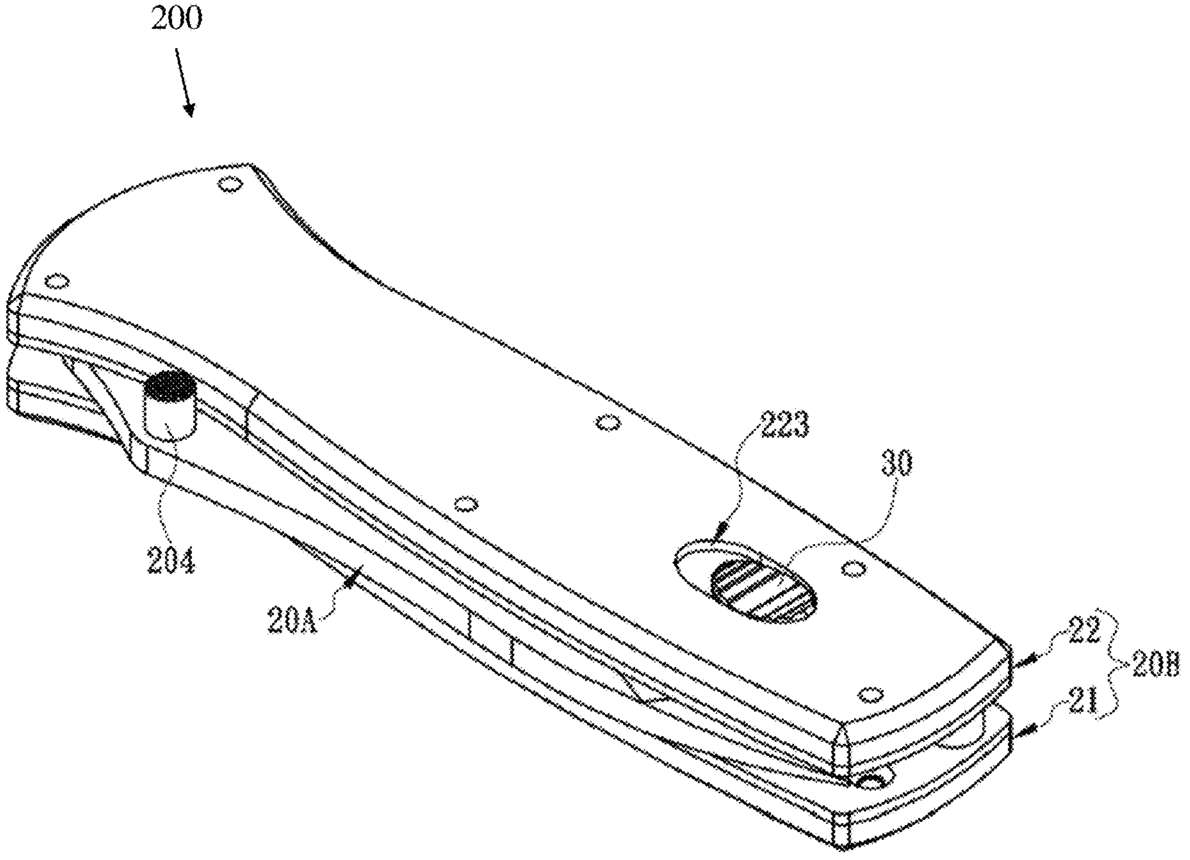
FIG. 1 is a perspective view of a folding knife according to one embodiment, showing the knife in a folded or closed configuration.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language. For example, operations described sequentially (e.g., assembly or disassembly of a folding knife) may in some cases be rearranged or performed concurrently. Moreover, for the sake of simplicity, the attached figures may not show the various ways in which the disclosed methods can be used in conjunction with other methods. As used herein, the terms “a”, “an” and “at least one” encompass one or more of the specified element. That is, if two of a particular element are present, one of these elements is also present and thus “an” element is present. The terms “a plurality of” and “plural” mean two or more of the specified element.

As used herein, the term “and/or” used between the last two of a list of elements means any one or more of the listed elements. For example, the phrase “A, B, and/or C” means “A,” “B,” “C,” “A and B,” “A and C,” “B and C,” or “A, B, and C.”

As used herein, the term “coupled” generally means physically coupled or linked. Two components that are coupled to each other can be directly connected to each other or can be indirectly connected to each other with one or more intermediate elements between the coupled items.

As used herein, the term “integrally formed” generally means formed as a unitary structure. Two of more components can be integrally formed, for example, by machining the components as a unitary structure from a single piece of material. Two of more components can be integrally formed, for example, by welding two components together to form a unitary structure.

Exemplary Embodiments

The present disclosure concerns folding knives that can be more easily disassembled than known folding knives, such as for cleaning or replacing a blade or other components. For example, folding knives disclosed herein can be assembled and disassembled without the use of any tools (e.g., without a screwdriver, etc.). The disclosed folding knives include a handle having first and second side portions having complementary locking elements which can prevent the side portions from being separated from one another in a locked or engaged configuration and which allow the side portions to be separated from one another in an unlocked or released configuration (which is also referred to herein as a disengaged configuration). In some instances, the handle comprises an actuation mechanism configured for moving the locking elements between the locked and unlocked configurations.

Figure 2:
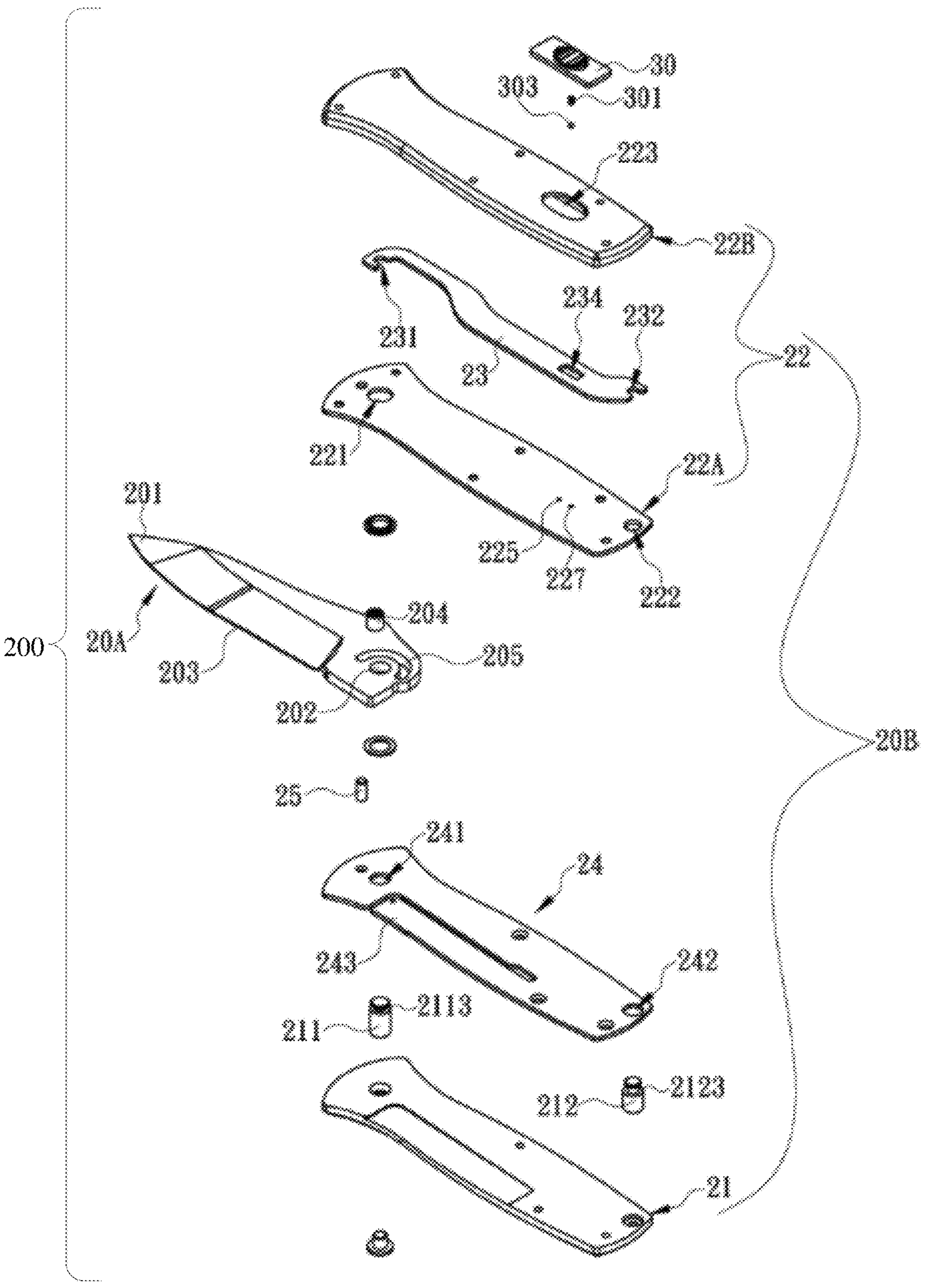
FIG. 2 is an exploded view of the folding knife of FIG. 1.
Figure 3:
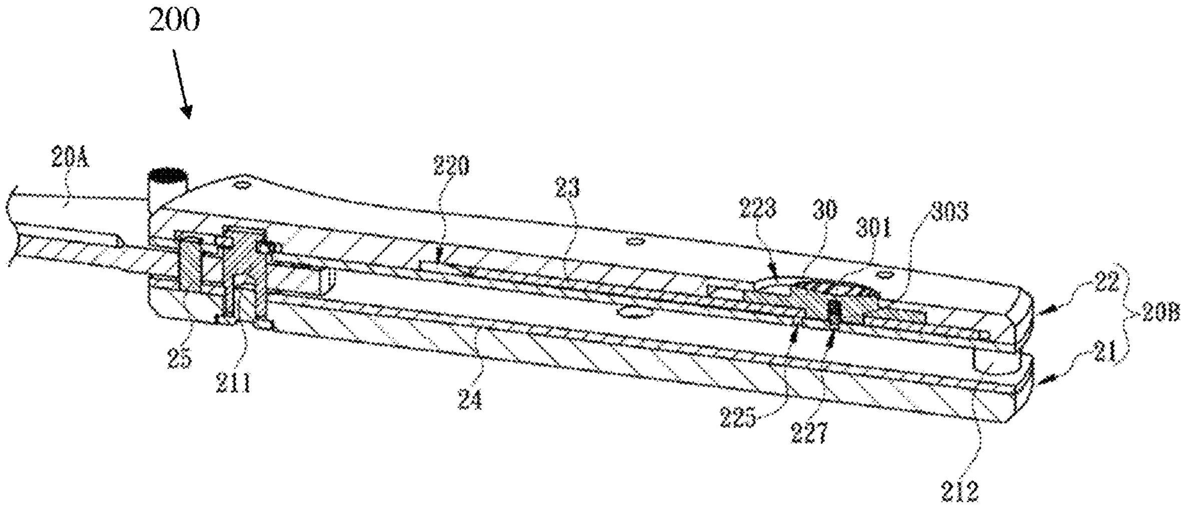
FIG. 3 is a partial cross-sectional view of the folding knife of FIG. 1, showing the knife in an unfolded or open configuration.
Figure 4:
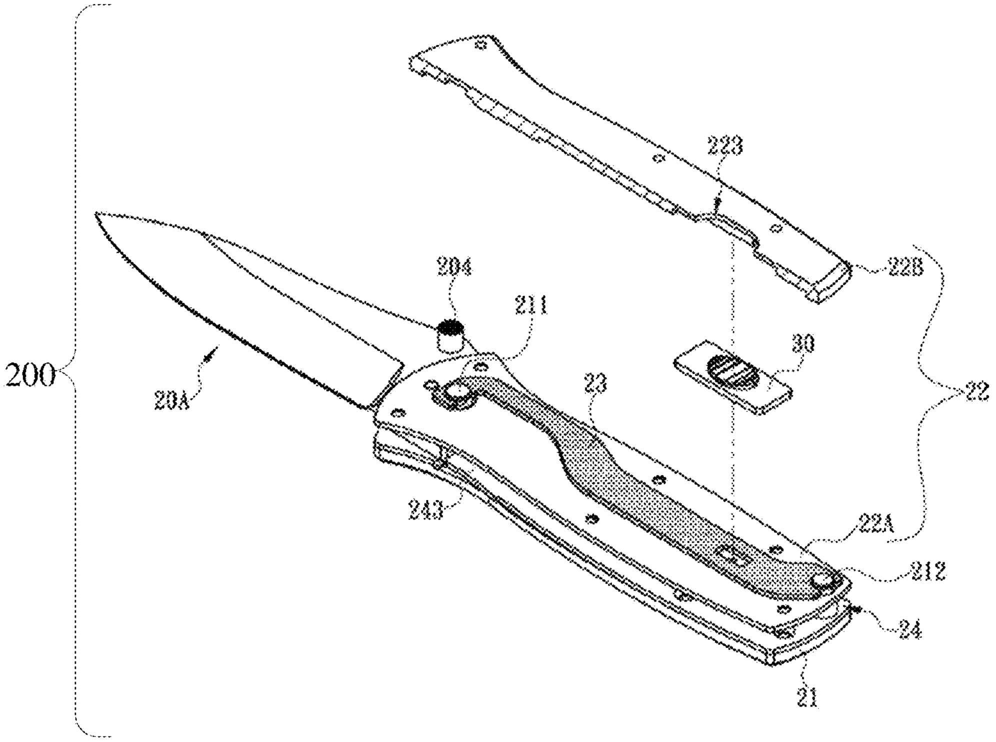
FIG. 4 is a partial exploded view of the folding knife of FIG. 1, showing an engaging plate and engaging posts of the folding knife in a locked or engaged state.

FIGS. 1-6 show a folding knife 200, according to one embodiment. The folding knife 200 can be rapidly assembled and disassembled. Referring to FIGS. 1-3, the folding knife 200 comprises two main components: a blade 20A and a handle 20B. As shown in FIGS. 1 and 4, the handle 20B has a first handle portion 21 and a second handle portion 22 that are spaced apart to create a blade-receiving space. The blade 20A can be pivoted relative to the handle 20B between a closed or folded configuration (e.g., FIG. 1) and an open or unfolded configuration (e.g., FIG. 4). As further explained below, the first handle portion 21 and the second handle portion 22 have complementary locking elements which can prevent the side portions and the blade from being separated from one another when the locking elements are in a locked or engaged configuration and which allow the side portions and the blade to be separated from one another when the locking elements are in an unlocked or release configuration.

Referring to FIG. 2, the blade 20A is formed with a pivotal connection hole 202 at a proximal end portion of the blade 20A. A distal end portion of the blade 20A comprises a tip 201. In some embodiments, the blade 20A can comprise an optional gripping element configured to assist a user with moving the blade 20A between the open and closed configurations. For example, in the illustrated embodiment, the blade 20A comprises a thumb stud 204. As shown in FIG. 1, the thumb stud 204 is exposed from the handle 20B when the blade is in the closed configuration. A user can pivot the blade 20A out of the handle 20B by pushing the thumb stud 204 with their thumb or finger.

With continued reference to FIGS. 1-3, the handle 20B includes a first handle portion 21 and a second handle portion 22. The inner side of the first handle portion 21 is protrudingly provided with a first engaging post 211 at a position adjacent to one end of the first handle portion 21 and is protrudingly provided with a second engaging post 212 at a position adjacent to the opposite end of the first handle portion 21. In the illustrated embodiment, the first engaging post 211 and the second engaging post 212 are independently formed components, each configured to be fixed to the inner side of the first handle portion 21 at one end. Moreover, the opposite end (hereinafter referred to as the second end) of the first engaging post 211 is circumferentially provided with a first engaging groove 2113 while the opposite end (hereinafter referred to as the second end) of the second engaging post 212 is circumferentially provided with a second engaging groove 2123. In other embodiments, the first engaging post 211 and the second engaging post 212 may be integrally formed with the first handle portion 21 instead to meet production or design requirements, e.g., to reduce the number of components. Also, it should be noted that although the folding knife 200 shows first and second engaging posts, in other embodiments, a folding knife can have only one engaging post (e.g., one at one end of the knife) or more than two engaging posts.

Referring again to FIGS. 1-3, the second handle portion 22 is formed therein with a receiving space 220. The inner side of the second handle portion 22 is formed with a first engaging hole 221 at a position adjacent to one end of the second handle portion 22 and is formed with a second engaging hole 222 at a position adjacent to the opposite end (hereinafter referred to as the second end) of the second handle portion 22. In addition, the outer side of the second handle portion 22 is formed with a switch hole 223. The first engaging hole 221, the second engaging hole 222, and the switch hole 223 are in communication with the receiving space 220. In this embodiment, the second handle portion 22 is assembled from an inner part 22A and an outer part 22B, the receiving space 220 is formed between the inner part 22A and the outer part 22B, the first engaging hole 221 and the second engaging hole 222 are provided at two opposite ends of the inner part 22A respectively, and the switch hole 223 is provided in the outer part 22B. In other embodiments, the structure of the second handle portion 22 may be adjusted as appropriate to include a single one component or multiple components, provided that the second handle portion 22 has the foregoing structural features. An engaging plate 23 is mounted in the receiving space 220 of the second handle portion 22. The engaging plate 23 can be displaced toward either of two opposite ends of the receiving space 220 and is formed with a first engaging portion 231 at a position adjacent to one end of the engaging plate 23 and a second engaging portion 232 at a position adjacent to the opposite end of the engaging plate 23. The first engaging portion 231 matches the first engaging groove 2113 in the illustrated configuration and can be engaged or received in the first engaging groove 2113. The second engaging portion 232 matches the second engaging groove 2123 in illustrated configuration and can be engaged or received in the second engaging groove 2123.

As shown in FIGS. 1-3, the second handle portion 22 can include a switch 30. The switch 30 extends into and is received in the switch hole 223 and can be displaced toward either of two opposite ends of the switch hole 223. The inner side of the switch 30 is connected to the engaging plate 23 in order for the switch 30 to drive or displace the engaging plate 23 upon displacement of the switch 30. The outer side of the switch 30 is exposed through the switch hole 223 so that a user can push the switch 30 with a finger, thereby displacing the engaging plate 23 toward either a first end or an opposite second end of the receiving space 220. Once the blade 20A is pivotally connected to the first handle portion 21 by inserting the first engaging post 211 through the pivotal connection hole 202 of the blade 20A, and the second handle portion 22 is assembled to the first handle portion 21 by inserting the second ends of the first engaging post 211 and of the second engaging post 212 into the first engaging hole 221 and the second engaging hole 222 respectively, the user can bring the first engaging portion 231 and the second engaging portion 232 of the engaging plate 23, respectively, into engagement in the first engaging groove 2113 and the second engaging groove 2123 (see FIG. 4) simply by pushing the switch 30 with a finger and thus displacing the engaging plate 23 toward the second end of the receiving space 220 (e.g., rightward as shown in FIG. 3). Thus, the first handle portion 21 and the second handle portion 22 are rapidly and securely coupled to each other to form the handle 20B, with the engaging portions 231, 232 restricted respectively by the engaging grooves 2113, 2123 to prevent the first handle portion 21 and the second handle portion 22 from separating from each other. The blade 20A can now be rotated about its pivot shaft (i.e. the first engaging post 211) in order to store the cutting edge 203 between the first handle portion 21 and the second handle portion 22, leaving only the thumb stud 204 outside the handle 20B (see FIG. 1). In this embodiment, the switch 30 is located on one side of the second handle portion 22 and is adjacent to the second end of the second handle portion 22, the engaging plate 23 is formed with an engaging hole 234, and the switch 30 is assembled to the engaging plate 23 by having the inner side of the switch 30 engaged in the engaging hole 234. In practice, however, the way the switch 30 and the engaging plate 23 are assembled together may be adjusted according to product requirements. The position of the switch hole 223 may also be adjusted so that the switch 30 is located elsewhere on the second handle portion 22, as long as the switch 30 can be used to displace the engaging plate 23.

Figure 5:
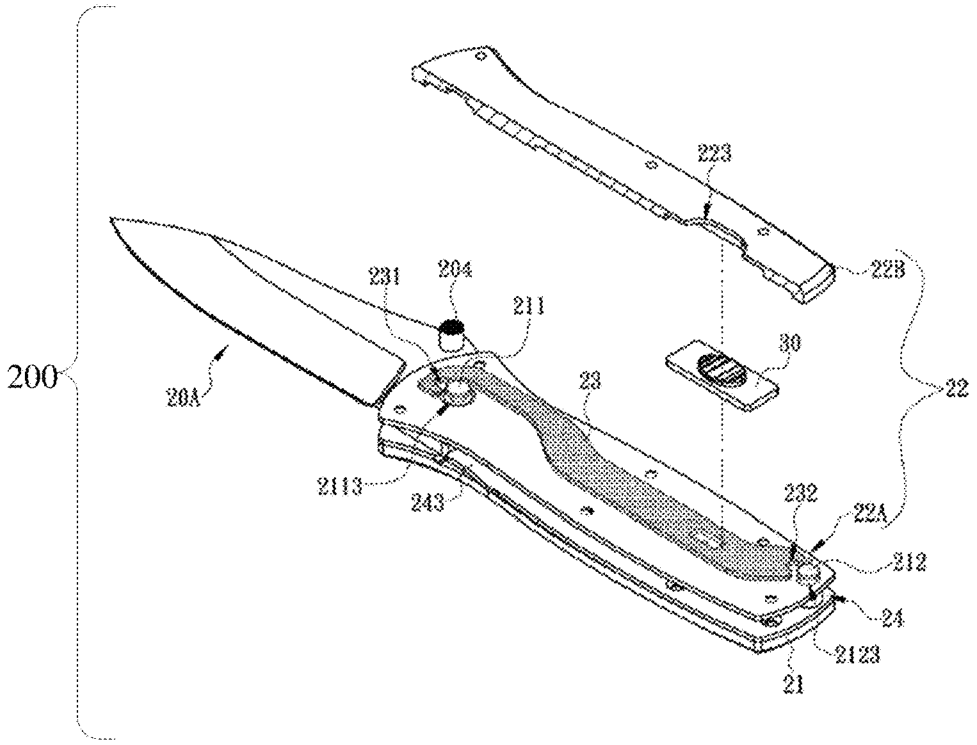
FIG. 5 is a partial exploded view, showing the engaging plate and the engaging posts of the folding knife in an unlocked or released state.

Referring again to FIGS. 1-3, when it is desired to disassemble the folding knife (e.g., in order to get rid of the dirt therein), the user only has to push the switch 30 with a finger and thereby displace the engaging plate 23 toward the first end of the receiving space 220 (e.g., leftward as shown in FIG. 3), and the first engaging portion 231 and the second engaging portion 232 of the engaging plate 23 will be respectively disengaged from the first engaging groove 2113 and the second engaging groove 2123 at the same time (see FIG. 5). Once the engaging portions 231, 232 are no longer engaged in the engaging grooves 2113, 2123 respectively, the user can detach the second handle portion 22 and the blade 20A sequentially from the first handle portion 21 in order to clean the folding knife or to replace the blade 20A with a new one. The structure of the folding knife is so designed that, simply by pushing the switch 30, the user can render the folding knife rapidly but surely into a state where disassembly is allowed (see FIG. 5) or a state where disassembly is prevented (see FIG. 4). In this manner, the folding knife 200 eliminates the complicated steps required to disassemble and reassemble conventional folding knives by providing a simple and reliable assembly/disassembly mechanism.

The folding knife 200 can, in some embodiments, include a blade-locking mechanism configured to secure the blade in the open and/or closed configurations. For example, in the illustrated embodiment, the folding knife 200 comprises an optional liner-lock type blade-locking mechanism. Referring again to FIGS. 1-3, the liner lock comprises an elastic plate 24 mounted between the first handle portion 21 and the second handle portion 22. The elastic plate 24 is formed with a first through hole 241 at a position adjacent to one end of the elastic plate 24 and is formed with a second through hole 242 at a position adjacent to the opposite end of the elastic plate 24 so that the first engaging post 211 can pass through the first through hole 241 into the first engaging hole 221 while the second engaging post 212 passes through the second through hole 242 into the second engaging hole 222. The elastic plate 24 is further provided with a stopping portion or locking member 243 in the form of a leaf spring. When the blade 20A has been rotated completely out of the handle 20B, the stopping portion 243 is engaged with the aforesaid end of the blade 20A such that the blade 20A cannot be rotated into the handle 20B. Only when the stopping portion 243 is forced out of engagement with the blade 20A can the blade 20A be rotated again and thereby stored in the handle 20B. While the stopping portion 243 is depicted in the drawings as a plate, it is feasible in another embodiment to configure the stopping portion 243 otherwise (e.g., as a protuberance), and in that case, the aforesaid end of the blade 20A will be provided with a groove corresponding in position to the protuberance in order to engage with the protuberance.

In some embodiments, as shown in FIGS. 2-3, the blade 20A can optionally comprise a curved position-limiting groove 205 at a position adjacent to the end of the blade 20A, and the handle 20B can include a position-limiting post 25. The groove 205 together with the position-limiting post 25 can limit rotation of the blade 20A relative to the handle 20B. In this embodiment, the position-limiting post 25 extends through the position-limiting groove 205 and has two opposite ends connected respectively to the inner side of the first handle portion 21 and the inner side of the second handle portion 22. The position of the position-limiting post 25 within the position-limiting groove 205 is changed when the blade 20A is rotated. For example, when the blade 20A has been rotated completely out of the handle 20B, the position-limiting post 25 is pressed against the wall of one end of the position-limiting groove 205. When the blade 20A is subsequently rotated to be stored in the handle 20B, the position of the position-limiting post 25 in the position-limiting groove 205 is gradually changed. Once the blade 20A is entirely stored in the handle 20B, the position-limiting post 25 is pressed against the wall of the opposite end of the position-limiting groove 205. Thus, by adjusting the length of the position-limiting groove 205, it can be ensured that the blade 20A will be kept securely at the predetermined terminal positions, without fear that a user may rotate the blade 20A excessively. It should be pointed out that, when the folding knife includes the elastic plate 24, the position-limiting post 25 extends through the elastic plate 24 (see FIG. 3).

Figure 6:
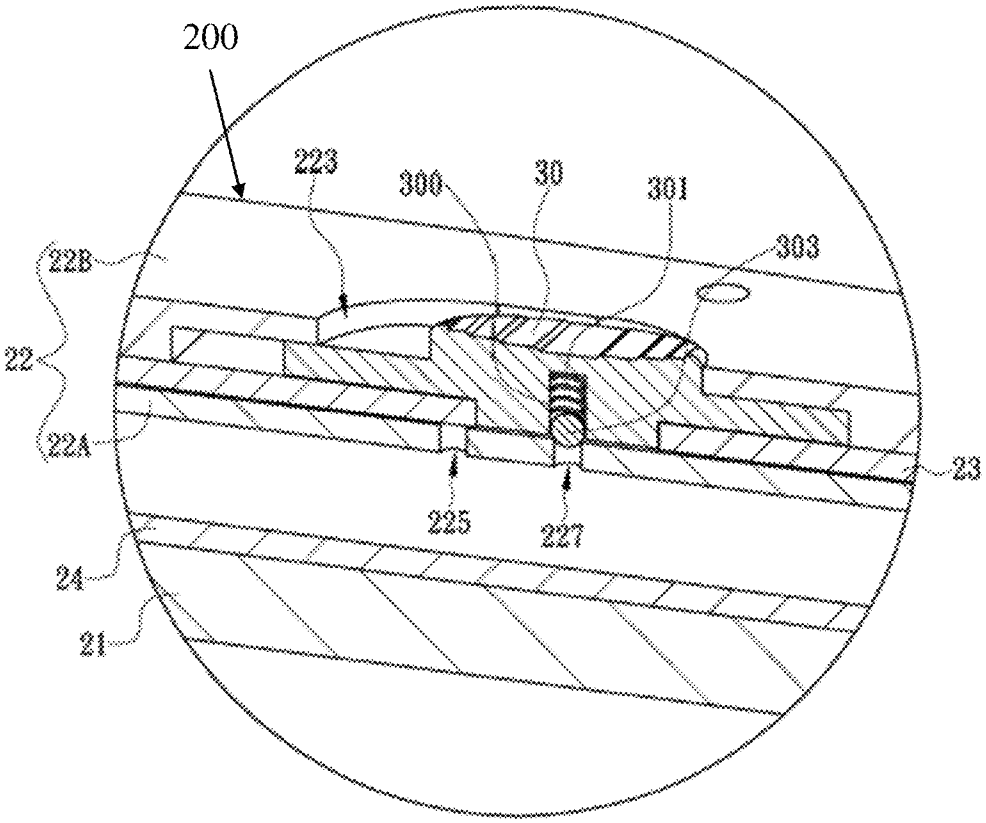
FIG. 6 is a partial cross-sectional view of the folding knife of FIG. 1, showing a switch of the folding knife in a first position.

Referring to FIGS. 2 and 6, in some embodiments, the bottom side of the switch 30 is formed with a recess 300. A spring 301 and a ball 303 can be mounted within the recess 300. In addition, the inner side of the second handle portion 22 is concavely provided with a first positioning hole 225 and a second positioning hole 227, both corresponding in position to the switch hole 223. In this embodiment, the first positioning hole 225 and the second positioning hole 227 are provided in the inner side of the inner part 22A at positions corresponding to the switch hole 223. When the switch 30 has been pushed and thereby displaced to one end of the switch hole 223, the ball 303 corresponds to the first positioning hole 225 and is pushed by the spring 301 into engagement in the first positioning hole 225, thereby securing the switch 30 in place. In the course in which the switch 30 is pushed and thereby displaced in the opposite direction, the ball 303 is forced to push the spring 301 further into the recess 300. Once the switch 30 reaches the opposite end of the switch hole 223, the ball 303 corresponds to the second positioning hole 227 and is pushed by the spring 301 into engagement in the second positioning hole 227, thereby securing the switch 30 where it is. The switch 30, therefore, cannot be displaced without being pushed by a force that can overcome the force applied by the spring 301 to the ball 303. This feature protects against accidental movement of the switch, such as when the folding knife is placed in a bag or pocket.

Additional details about the folding knife 200 can be found in U.S. Pat. No. 10,226,871, which is incorporated by reference herein.

FIGS. 7-24C show a folding knife 100 and its components. The folding knife 100 is generally similar to the folding knife 200 in that it is easily assembled/disassembled by moving an actuation mechanism between a locked/engaged position and an unlocked/released position. One distinction between the folding knife 100 and the folding knife 200 is that the actuation mechanism of the folding knife 100 comprises additional safety features. These safety features can, for example, protect against inadvertent disassembly of the folding knife 100.

Figure 7:
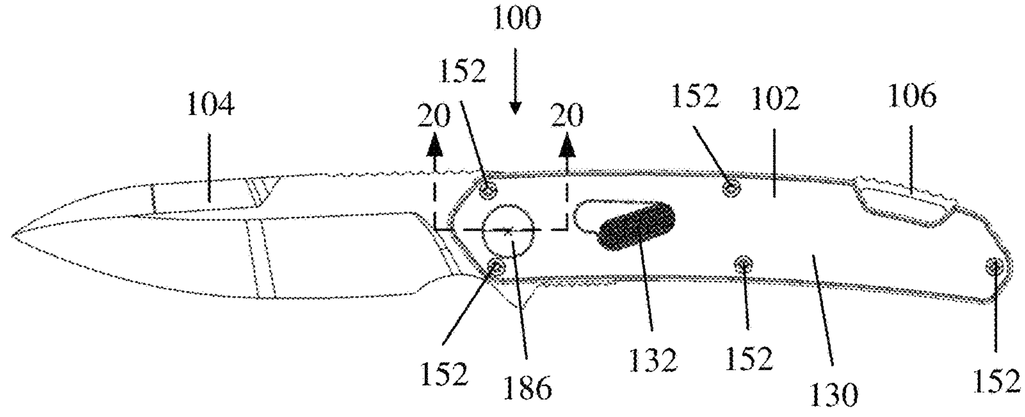
FIG. 7 is a side elevation view of a folding knife according to another embodiment, showing a first side of the folding knife and the folding knife in an unfolded or open configuration.
Figure 8:
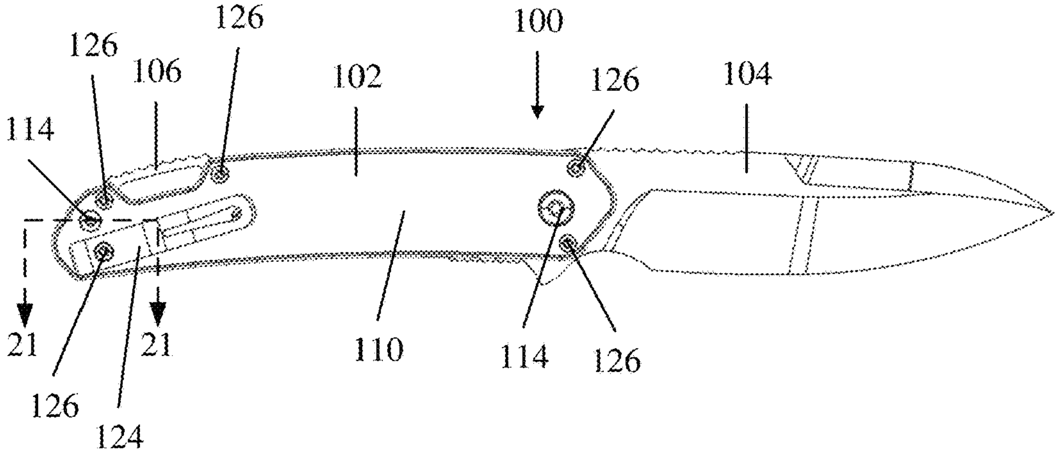
FIG. 8 is a side elevation view of the folding knife of FIG. 7, showing a second side of the folding knife and the folding knife in an unfolded or open configuration.
Figure 9:
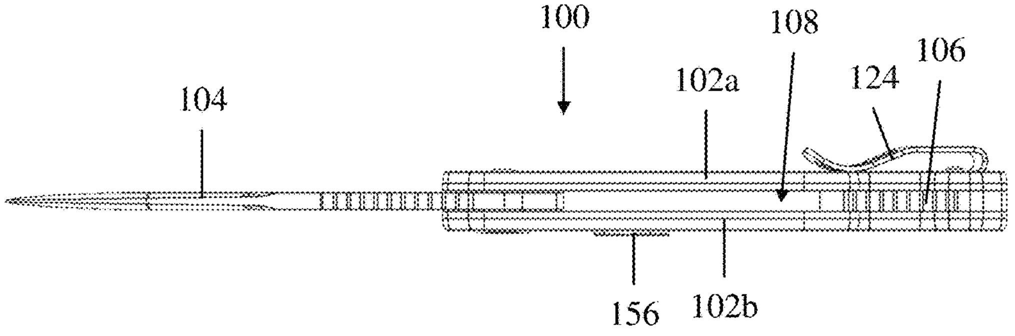
FIG. 9 is a bottom plan view of the folding knife of FIG. 7, showing the folding knife in an unfolded or open configuration.

Referring to FIGS. 7-9, the folding knife 100 comprises a handle 102 and a blade 104. As shown in FIG. 9, the handle 102 of the folding knife 100 comprises a first side portion 102*a* and a second side portion 102*b* that are spaced apart by a spacer member (e.g., a backstrap 106). In this manner, the first and second side portions 102*a*, 102*b* of the handle 102 form a blade-receiving space 108 therebetween. The blade 104 is pivotably coupled to the handle 102 such that the blade 104 can be moved between an open/use configuration (e.g., FIG. 7) and a closed/storage position (not shown, but see, e.g., FIG. 1, which shows the folding knife 200 in the closed configuration).

As further explained below, the first and second side portions 102*a*, 102*b* of the handle 102 comprise components that form an actuation mechanism. The actuation mechanism can be selectively moved between the locked/engaged state (e.g., FIGS. 7-9), which prevents the side portions of the handle and the blade from being separated from each other, and the unlocked/released state, which allows the side portions of the handle and the blade to be separated from each other (e.g., FIGS. 10A-10B).

First the various components of the folding knife 100 are described in greater detail. The manner of actuating the actuation mechanism to assemble/disassemble the folding knife 100 is then further explained.

Figure 11:
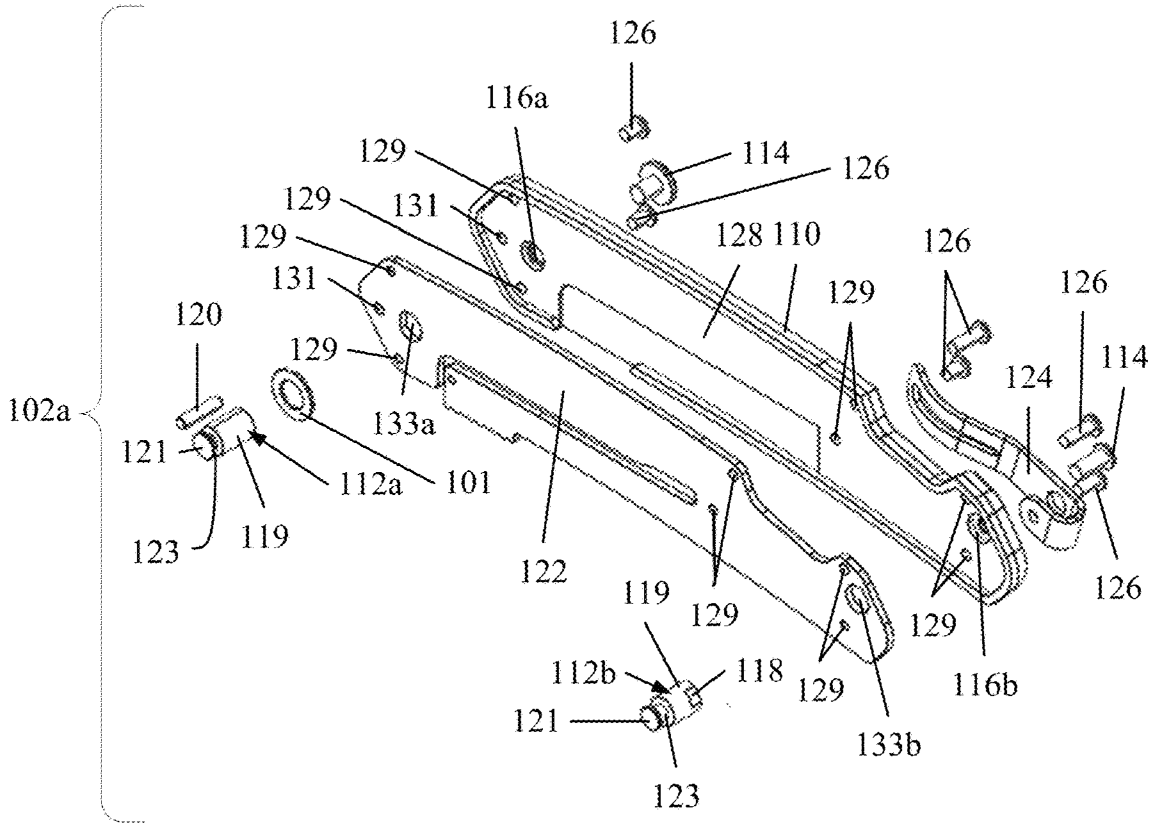
FIG. 11 is an exploded perspective view of a first handle portion of the folding knife of FIG. 7.
Figure 12:
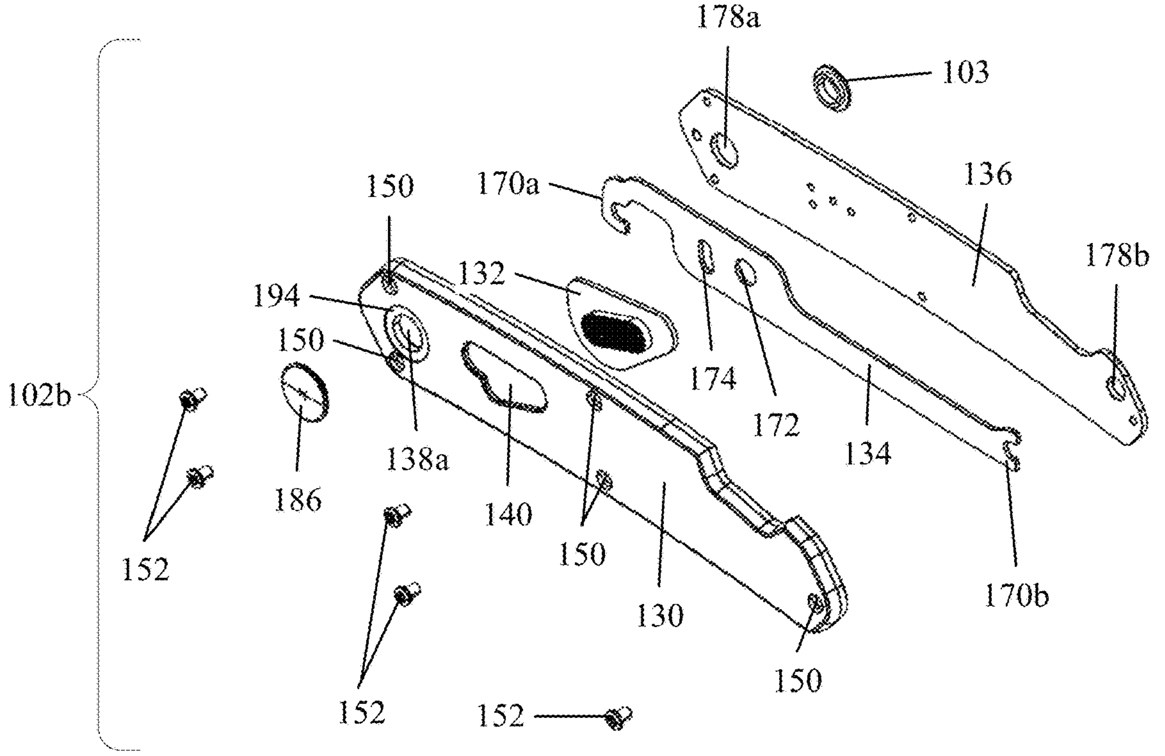
FIG. 12 is an exploded perspective view of a second handle portion of the folding knife of FIG. 7.

FIGS. 11 and 12 show the first side portion 102*a* and the second side portion 102*b* of the handle 102, respectively. As shown in FIG. 11, the first side portion 102*a* of the handle 102 comprises a first plate 110, a first engaging post 112*a*, and a second engaging post 112*b*. The first engaging post 112*a* and the second engaging post 112*b* are collectively or generically referred to herein as "the engaging posts 112."

Figure 10A:
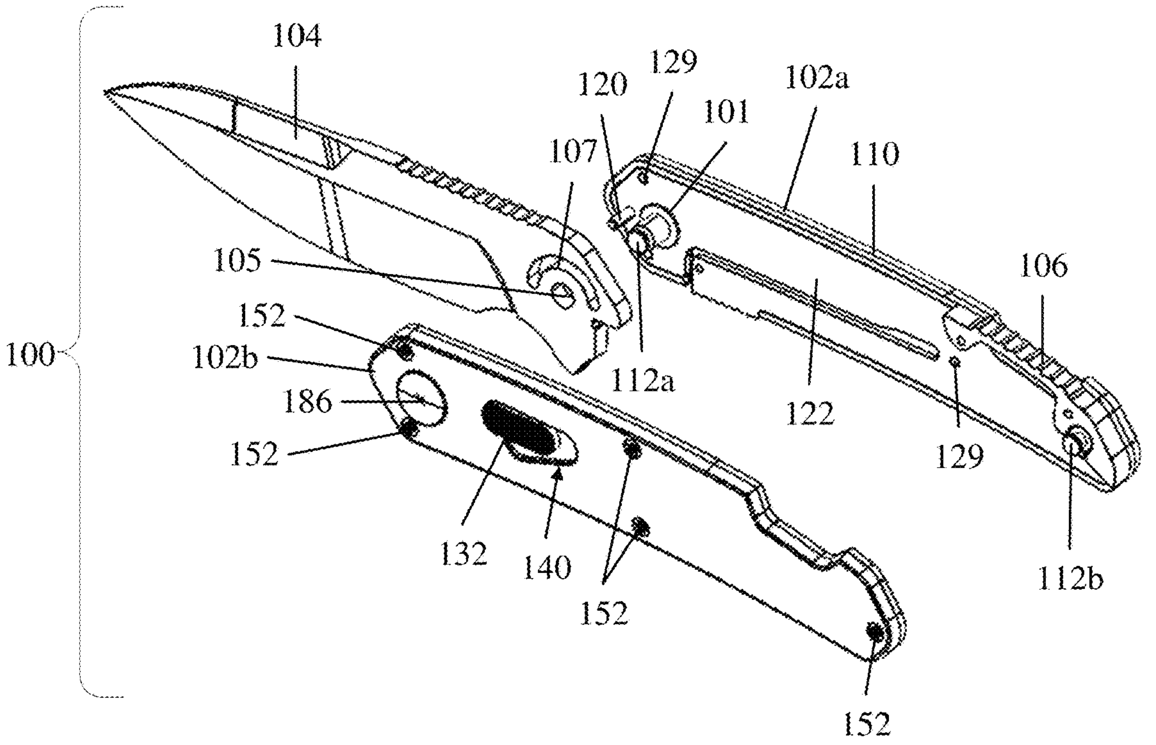
FIG. 10A is a perspective view of the folding knife of FIG. 7, showing the first side of the folding knife and the folding knife in a partially assembled configuration.
Figure 10B:
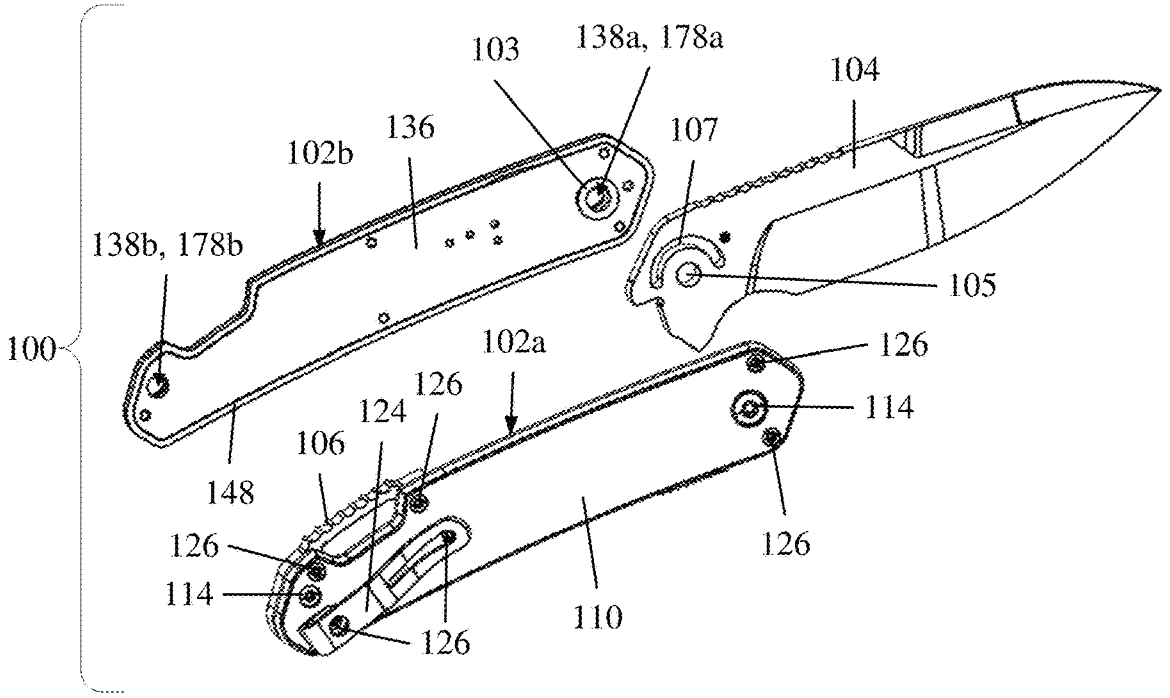
FIG. 10B is a perspective view of the folding knife of FIG. 7, showing the second side of the folding knife and the folding knife in the partially assembled configuration.

As shown in FIGS. 10A, 10B, and 11, the engaging posts 112 can be coupled to and/or extend laterally from an inner side of the first plate 110. In the illustrated embodiment, first fasteners 114 (e.g., screws) are used to couple the engaging posts 112 to the first plate 110. In other embodiments, the engaging posts can be coupled to the first plate in various other manners such as with other types of fasteners (e.g., rivets), adhesive, and/or the engaging posts 112 can be integrally formed with the first plate 110.

In some embodiments, the first plate 110 can comprise a first bore 116*a* and a second bore 116*b* (collectively or generically referred to herein as "the bores 116") each configured for receiving at least a portion of a respective engaging post 112. In some embodiments, the bores can comprise a circular cross-sectional profile, and the engaging posts can comprise a corresponding circular cross-sectional profile. In other embodiments, the bores can comprise a non-circular cross-sectional profile, and the engaging posts can comprise a corresponding non-circular cross-sectional profile. For example, in the illustrated embodiment, the bores 116 comprise a D-shaped cross-sectional profile, and the engaging posts 112 have flats 118 formed thereon. Configuring the bores 116 and the engaging posts 112 in this manner can, for example, prevent the engaging posts 112 from rotating relative to the first plate 110 when tightening/loosening the first fasteners 114.

The engaging posts 112 can comprise main shaft portions 119, head portions 121, and neck portions 123. As mentioned above, the main shaft portions 119 of the engaging posts 112 can have flats 118 formed thereon to mate with the D-shaped openings of the first plate 110. The main shaft portion 119 of the first engaging post 112*a* can also be sized and configured to be the pivot member about which the blade 104 pivots. The head portions 121 and the neck portions 123 are configured for selectively engaging the second side portion 102*b* of the handle 102.

In some embodiments, the first side portion 102*a* of the handle 102 can comprise one or more additional components. For example, in the illustrated embodiment, the first side portion 102*a* includes a blade guide pin 120, a locking mechanism (e.g., liner lock 122), and a clip 124. The blade guide pin 120, the liner lock 122, the clip 124, and/or backstrap 106 can be coupled to the first plate 110 in various ways, such as by second fasteners 126, friction (e.g., press fit), and/or adhesive.

In some embodiments, the first plate can comprise one or more recesses on the inner side configured for receiving a locking mechanism. For example, the first plate 110 comprises a recess 128 configured for receiving the liner lock 122. The recess 128 can have one or more depths (e.g., two in the illustrated embodiment). In some embodiments, the first plate can be formed without recesses, and/or the first plate and the liner lock can be integrally formed.

As shown in FIG. 11, the first plate 110 and/or the liner lock 122 can also comprise one or more connection openings 129 formed therein. The connection openings 129 formed in the first plate can be threaded or can be through-holes. The connection openings 129 formed in the liner lock 122 can be threaded and configured for receiving the second fasteners 126.

The first plate 110 and/or the liner lock 122 can also comprise a blade guide pin opening 131 configured for receiving the blade guide pin 120. As shown in FIGS. 10B and 11, in some embodiments, the blade guide pin opening 131 of the first plate 110 can be a bore that does not extend completely through the first plate 110 and the blade guide pin 120 can be inserted and fixedly secured therein.

In embodiments comprising a liner lock, the liner lock 122 can comprise a first post opening 133*a* and a second post opening 133*b* (collectively or generically referred to herein as "the post openings 133"), which are configured such that the first engaging post 112*a* and the second engaging post 112*b* can extend through the liner lock 122. In some embodiments, the post openings 133 can comprise a D-shaped cross-sectional profile configured to mate with a flat 118 of a respective engaging post 112.

With reference to FIGS. 10A-10B, the first side portion 102*a* of the handle 102 can be assembled by inserting the engaging posts 112 into the bores 116 of the first plate 110 and coupling the engaging posts 112 to the first plate 110 by the first fasteners 114. The blade guide pin 120 can be coupled to the first plate 110 by pressing the blade guide pin 120 into blade guide pin opening 131 of the first plate 110. The liner lock 122 can then be coupled to the first plate 110 by aligning the post openings 133 of the liner lock 122 with the engaging posts 112 and advancing the liner lock 122 over the engaging posts 112 and into the recess 128 (FIG. 11) of the first plate 110. The liner lock 122 is coupled to the first plate 110 by inserting the second fasteners 126 into the connection openings 129 of the first plate 110 and the liner lock 122. The backstrap 106 can be coupled to the inner side of the liner lock 122 by the second fasteners 126, and the clip 124 can be coupled to the outer side of the first plate 110 by the second fasteners 126. In some embodiments, a washer 101 can be positioned over the first engaging post 112*a*.

When the first side portion 102*a* of the handle 102 is assembled, the engaging posts 112 and the blade guide pin 120 extend laterally from the inner side of the liner lock 122. The second engaging post 112*b* also extends laterally from inner side of the backstrap 106.

Referring now to FIG. 12, the second side portion 102*b* of the handle 102 can comprise a second plate 130, a switch 132, an actuation mechanism (e.g., an engaging plate 134), and a third plate 136. As shown in FIGS. 10A-10B, the switch 132 and the engaging plate 134 are disposed at least partially between the second plate 130 and the third plate 136. The switch 132 and the engaging plate 134 are pivotably coupled together, the switch 132 and the engaging plate 134 are movably coupled to the second plate 130 and the third plate 136, and the third plate 136 is fixedly coupled to the second plate 130. In this manner, the second and third plates 130, 136 act as a housing for the switch 132 and the engaging plate 134.

Figure 13:
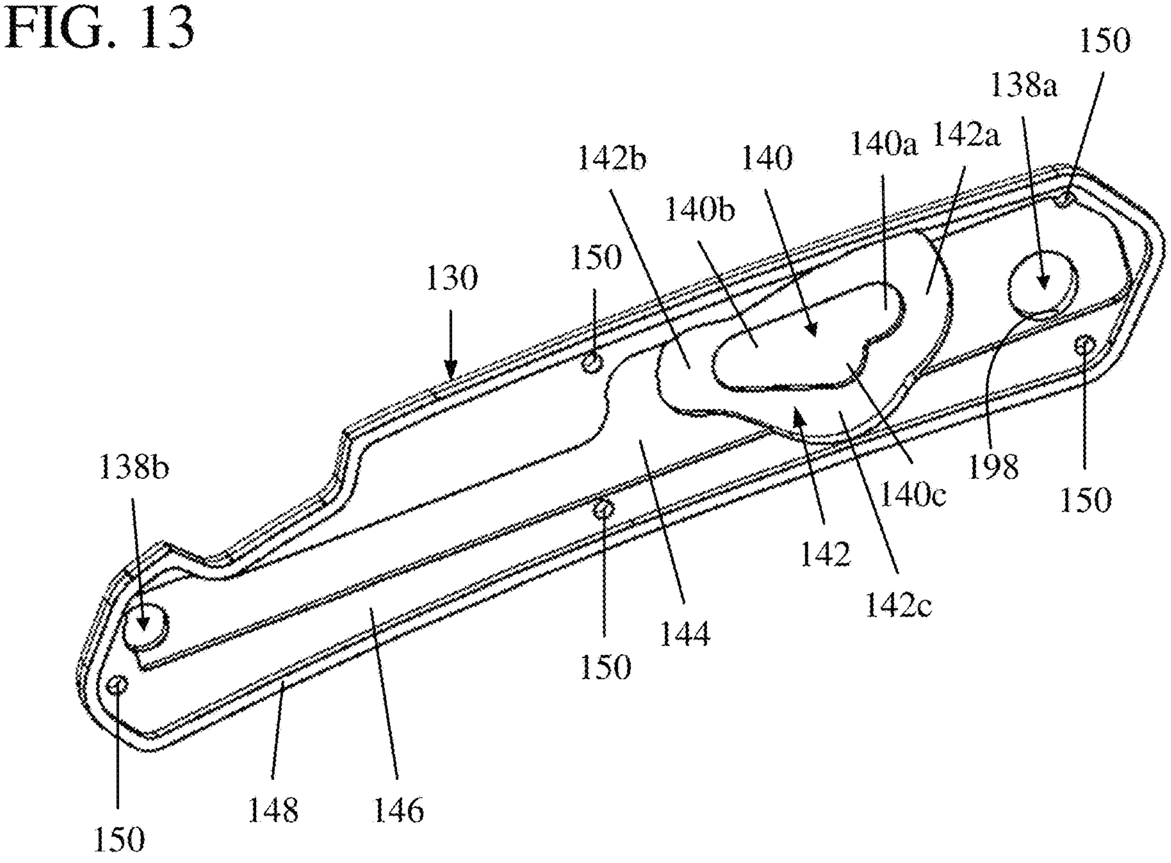
FIG. 13 is a perspective view of a plate of the folding knife of FIG. 7, showing an inner side portion of the plate.

Referring to FIG. 13, the second plate 130 comprises a plurality of openings, including a first post opening 138*a*, a second post opening 138*b*, and a switch opening 140. The first post opening 138*a* and the second post opening 138*b* are collectively or generically referred to herein as "the post openings 138." The first post opening 138*a* is configured for receiving at least a portion of the first engaging post 112*a* (see FIG. 19). The second post opening 138*b* is configured for receiving at least a portion of the second engaging post 112*b* (see FIG. 20). In some embodiments, the one or more of the post openings can extend completely through the second plate. In other embodiments, one or more of the post openings can be bores that do not extend completely through the second plate. For example, in the illustrated embodiment, the first post opening 138*a* extends completely through the second plate 130, and the second post opening 138*b* is a bore that does not extend completely through the second plate 130, as best shown in FIGS. 10A, 10B, and 13.

The switch opening 140 extends completely through the second plate 130. This allows the switch 132 to be accessible from an outer side portion of the second plate 130, as shown in FIG. 7. Referring to FIG. 13, the switch opening 140 can have a first segment 140*a*, a second segment 140*b*, and a third segment 140*c*. The first segment 140*a* and the second segment 140*b* of the switch opening 140 both extend generally in a longitudinal direction and partially overlap. The first segment 140*a* extends farther toward the first post opening 138*a* than the second segment 140*b*, and the second segment 140*b* extends farther toward the second post opening 138*b* than the first segment 140*a*. The first segment 140*a* and the second segment 140*b* allow the switch 132 to move longitudinally (i.e., in a direction along the length of the handle) relative to the second plate 130 along a path between the positions shown in FIGS. 22A and 22B, respectively. The second segment 140*b* and the third segment 140*c* of the switch opening 140 partially overlap. The third segment 140*c* extends from the second segment 140*b* at an angle. The second segment 140*b* and the third segment 140*c* allow the switch 132 to pivot along a path between the positions shown in FIGS. 22B and 22C, respectively.

Referring again to FIG. 13, the inner side portion of the second plate 130 can comprise one or more recessed portions configured for receiving at least a portion of the switch 132 and/or the engaging plate 134. The recessed portions of the second plate 130 together with the third plate can form tracks for the switch 132 and the engaging plate 134 to traverse. For example, the second plate 130 comprises a switch recess 142, an engaging plate recess 144, and a third plate recess 146.

The switch recess 142 circumscribes the switch opening 140. The switch recess 142 is configured to allow the switch 132 to move between a plurality of positions relative to the second plate 130. Specifically, the switch recess 142 comprises a first segment 142*a*, a second segment 142*b*, and a third segment 142*c*, which correspond to the first, second, and third segments 140*a*, 140*b*, 140*c* of the switch opening 140, respectively. The depth of the switch recess 142 from an inner-most surface 148 of the second plate 130 is greater than the depth of the engaging plate recess 144 and greater than the depth of the third plate recess 146.

The engaging plate recess 144 extends from the first post opening 138*a*, over the switch recess 142, and to the second post opening 138*b*. The engaging plate recess 144 comprises the shape of the engaging plate 134 in the vertical direction, but the engaging plate recess 144 is longer than the engaging plate 134 in the longitudinal direction. As such, the engaging plate 134 can slide longitudinally within the engaging plate recess 144, as further explained below (see FIGS. 24A-24C). The depth of the engaging plate recess 144 from the inner-most surface 148 of the second plate 130 is less than the depth of the switch recess 142 and greater than the depth of the third plate recess 146.

Referring still to FIG. 13, the third plate recess 146 can circumscribe (at least substantially) the switch recess 142 and the engaging plate recess 144. The depth of the third plate recess 146 from the inner-most surface 148 of the second plate 130 is less than the depth of the switch recess 142 and less than the depth of the engaging plate recess 144. As shown in FIG. 10B, the depth of the third plate recess 146 and the third plate 136 can be configured such that the inner side of the third plate 136 is flush with the inner-most surface 148 of the second plate 130 when the second side portion 102*b* of the handle 102 is assembled (see FIG. 10B). In some embodiments, the second plate 130 can be formed without the third plate recess 146.

In some embodiments, the second plate 130 can comprise one or more connection openings 150 (e.g., five in the illustrated embodiment) configured for receiving third fasteners 152. The connection openings 150 can be threaded or can be through-holes.

Figure 14:
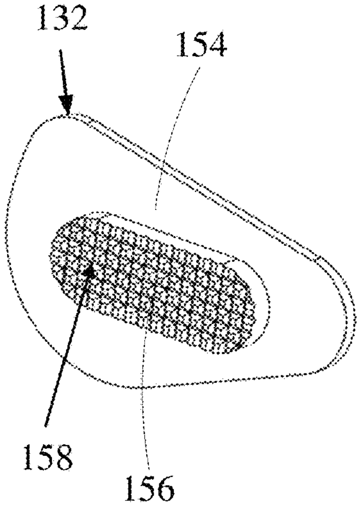
FIG. 14 is a perspective view of a switch of the folding knife of FIG. 7, showing an outer side portion of the switch.

Referring now to FIG. 14, the switch 132 of the second side portion 102*b* of the handle 102 can comprise a base portion 154 and an actuation projection 156 extending laterally from an outer side of the base portion 154.

The base portion 154 of the switch 132 is configured to be disposed within the switch recess 142 of the second plate 130 (FIG. 13). The base portion 154 of the switch 132 is sized and configured in conjunction with the switch recess 142 of the second plate 130 such that the switch 132 can move (e.g., pivot and slide) relative to the second plate 130 and the third plate 136, as further explained below (see FIGS. 22A-24C).

The actuation projection 156 of the switch 132 is configured to extend through the switch opening 140 of the second plate 130. The actuation projection 156 of the switch 132 is sized and configured in conjunction with the switch opening 140 of the second plate 130 such that the switch 132 can move (e.g., pivot and slide) relative to the second plate 130 and the third plate 136, as further explained below (see FIGS. 22A-24C).

In the illustrated embodiment, the actuation projection 156 of the switch 132 is configured to protrude laterally beyond the outer surface of the second plate 130, as shown in FIG. 9. The extent to which the actuation projection of the switch protrudes from the outer surface of the second plate can vary in different embodiments. Configuring the actuation projection of the switch such that it protrudes to a greater extent from the outer surface of the second plate can, for example, make the switch easily accessible. Configuring the actuation projection of the switch such that it protrudes to a lesser extent from the outer surface of the second plate can, for example, reduce the likelihood that the switch is inadvertently moved. In some embodiments, the actuation projection of the switch can be configured so as to be flush or even slightly recessed relative to the outer surface of the second plate. This can further reduce the likelihood that the switch is inadvertently moved.

As shown in FIG. 14, in some embodiments, the actuation projection 156 of the switch 132 can comprise one or more gripping elements 158. The gripping elements 158 can be knurling, ribs, nubs, other elements, and/or coatings (e.g., rubberized) configured to increase friction between the actuation projection 156 and a user's thumb or finger.

Figure 15:
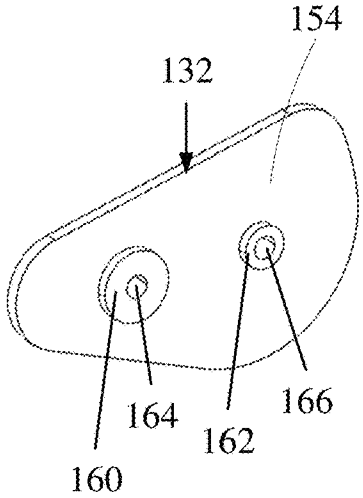
FIG. 15 is a perspective view of the switch of the folding knife of FIG. 7, showing an inner side portion of the switch.

Referring to FIG. 15, the switch 132 can further comprise a pivot projection 160 and a guide projection 162 extending laterally from an inner side of the base portion 154. The pivot projection 160 and the guide projection 162 of the switch 132 are configured to extend through the engaging plate 134. As further explained below, the pivot projection 160 and the guide projection 162 of the switch 132 allow the switch 132 to pivot relative to the engaging plate 134 and cause the switch 132 and the engaging plate 134 to move together longitudinally (see FIGS. 23A-24C).

As shown in FIG. 15, in some embodiments, the pivot projection 160 and the guide projection 162 of the switch 132 can each comprise a respective bore 164, 166. Each bore 164, 166 can be configured to at least partially house biasing components (e.g., a spring and a ball). The biasing components can be used, for example, to reduce "play" in the switch and/or to help resist inadvertent movement between the switch 132 and the second plate 130. In lieu of or in addition to the bores 164, 166, the switch 132 can comprise other elements configured for coupling a biasing element to the switch.

Figure 16:
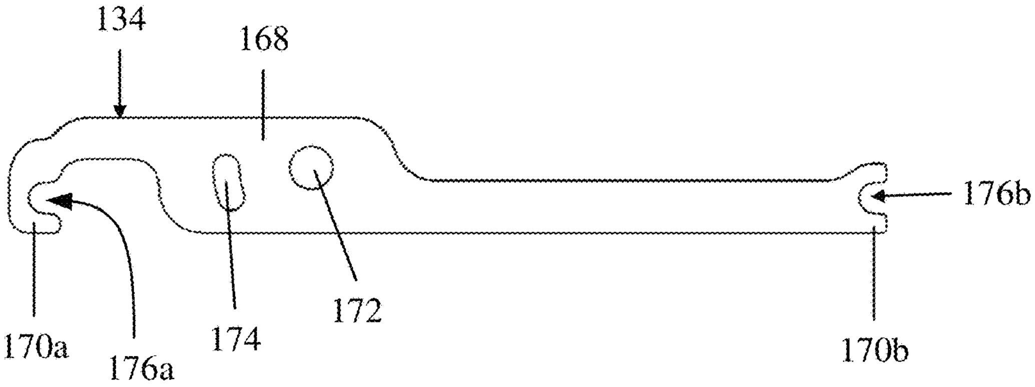
FIG. 16 is a side elevation view of an engaging plate of the folding knife of FIG. 7.

FIG. 16 shows the engaging plate 134, which can be a relatively thin, flat plate. The engaging plate 134 is configured such that it can be moved relative to the second side plate 130 (e.g., via the switch 132) to selectively engage the engaging posts 112 of the first side portion 102*a* of the handle 102. The engaging plate 134 of the second side portion 102*b* of the handle 102 comprises a main body 168 and a first engaging portion 170*a* and a second engaging portion 170*b* extending from the main body 168. The first engaging portion 170*a* and the second engaging portion 170*b* of the engaging plate 134 are collectively or generically referred to herein as "the engaging portions 170."

Figure 24A:
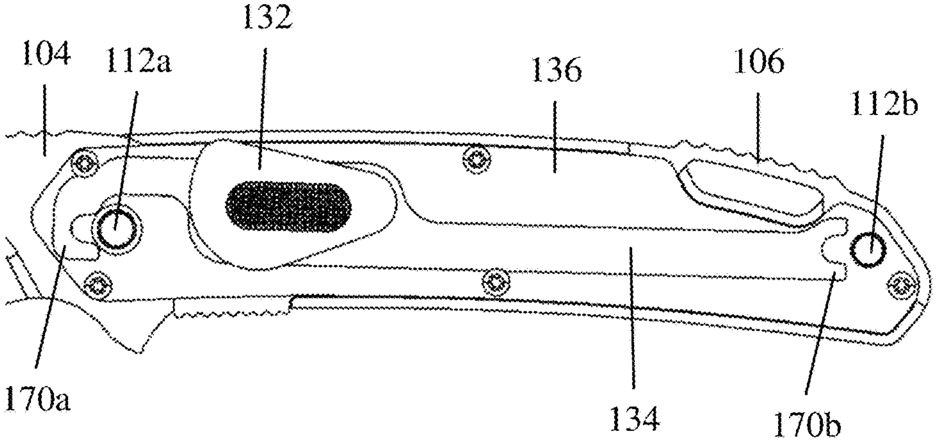
FIGS. 24A-24C are side elevation views of the first side of the handle of the folding knife of FIG. 7, showing an outer side of the handle with an outermost plate removed and the switch of the folding knife in various positions.
Figure 24B:
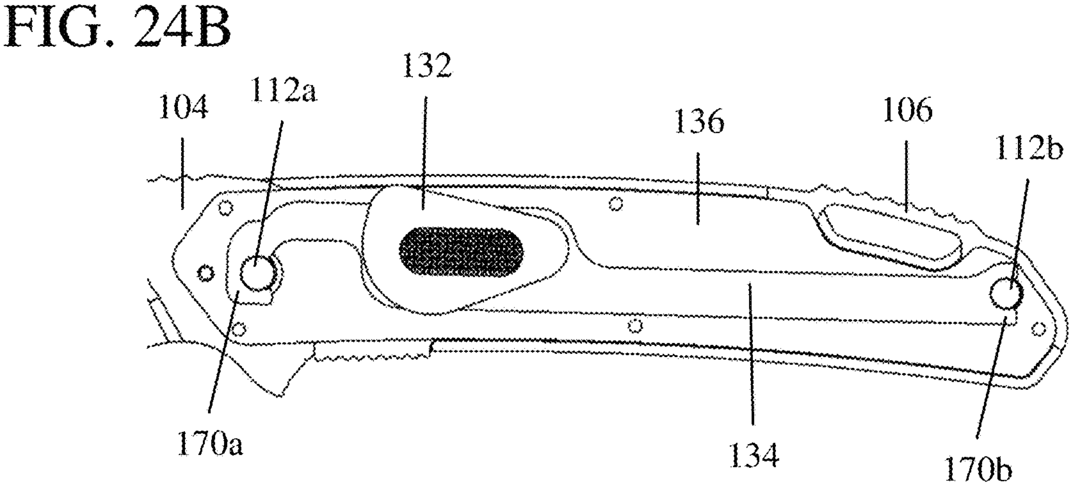

The main body 168 of the engaging plate 134 comprises a pivot opening 172 and a guide slot 174. The pivot opening 172 of the engaging plate 134 is configured for receiving the pivot projection 160 of the switch 132, and the guide slot 174 of the engaging plate 134 is configured for receiving the guide projection 162 of the switch 132. The pivot opening 172 has a circular shape and is sized so as to be just slightly larger than the pivot projection 160 of the switch 132. The guide slot 174 has an arcuate shape and is sized such that a radial dimension of the slot is just slightly larger than the diameter of the guide projection 162 of the switch 132. In this manner, the switch 132 can pivot relative to the engaging plate 134 about the pivot projection 160 and pivot opening 172. As the switch 132 pivots relative to the engaging plate 134, the guide projection 162 of the switch 132 traverses the guide slot 174 of the engaging plate 134, as shown in FIGS. 24A and 24B. Accordingly, the guide slot 174 of the engaging plate 134 (together with the second plate 130) limits the relative rotation between the switch 132 and the engaging plate 134.

The engaging portions 170 of the engaging plate 134 comprise "C" or "U" shaped portions that define notches 176 (individually referred to herein as "the notch 176*a*" or "the notch 176*b*"). The engaging portions 170 of the engaging plate 134 are configured to engage the engaging posts 112 of the first side portion 102*a* of the handle 102.

Figure 17:
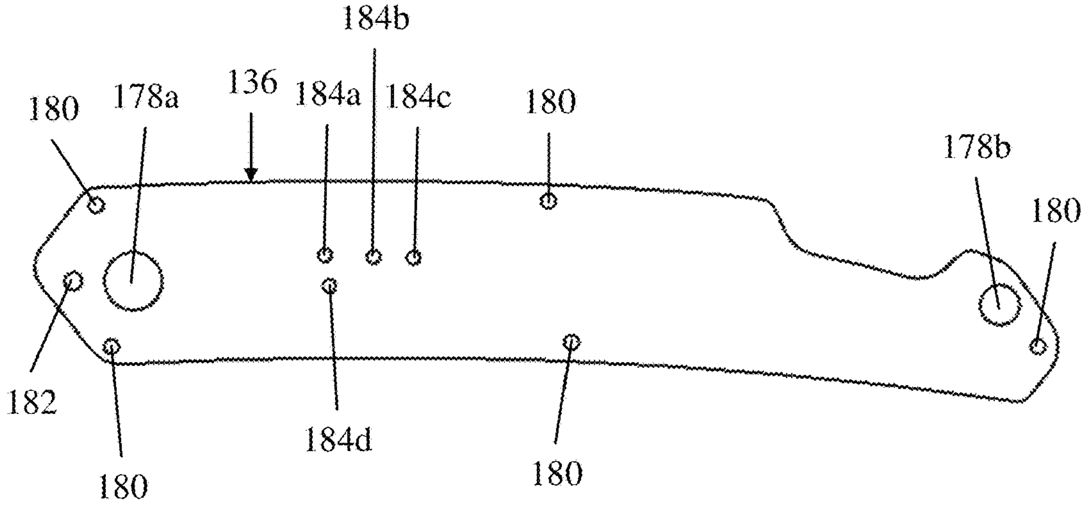
FIG. 17 is a side elevation view of another plate of the folding knife of FIG. 7.

Turning to FIG. 17, the third plate 136 of the second side portion 102*b* of the handle 102 is generally configured to retain the switch 132 and the engaging plate 134 within their respective recesses of the second plate 130. In this manner, the third plate 136 generally comprises the same configuration and shape as the second plate 130. Specifically, the third plate comprises a first post opening 178*a*, a second post opening 178*b*, one or more connection openings 180, and a blade guide pin opening 182. The post openings 178 of the third plate 136 can be configured to allow the engaging posts 112 of the first side portion 102*a* to pass therethrough. The connection openings 180 of the third plate 136 can threaded and configured to receive the third fasteners 152. The blade guide pin opening 182 of the third plate 136 can be configured to allow the blade guide pin 120 of the first side portion 102*a* to pass therethrough.

In some embodiments, the third plate can also comprise a plurality of positioning holes. For example, in the illustrated embodiment, the third plate 136 comprises four positioning holes 184*a*-184*d* (collectively or generically referred to herein as "the positioning holes 184"). The positioning holes 184, together with biasing components coupled to the switch 132, can help to selectively retain the switch 132 at one or more pre-defined positions relative to the third plate 136, and thus relative to the second plate 130.

In some embodiments, the third plate can comprise one or more recesses configured for receiving the switch 132 and/or the engaging plate 134 (e.g., similar to the first and second recesses 142, 144 of the second plate 130). In some of those embodiments, the second plate can be formed without the first and second recesses 142, 144. In other such embodiments, the second and third plates 130, 136 can have one or more recesses formed therein.

In some embodiments, the second side portion of the handle can comprise one or more covers or caps configured to cover the post openings of the second plate. For example, as shown in FIG. 7, the second side portion 102*b* of the handle 102 comprises a cap 186 configured to cover the first post opening 138*a* of the second plate 130. Although not shown, in other embodiments, the second post opening 138*b* of the second plate 130 can extend completely through the second plate 130 and a cap configured for covering the second post opening can be included.

Figure 18:
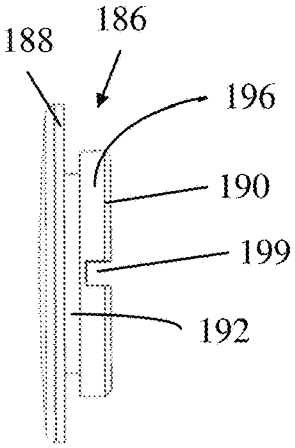
FIG. 18 is a side elevation view of a cap of the folding knife of FIG. 7.
Figure 19:
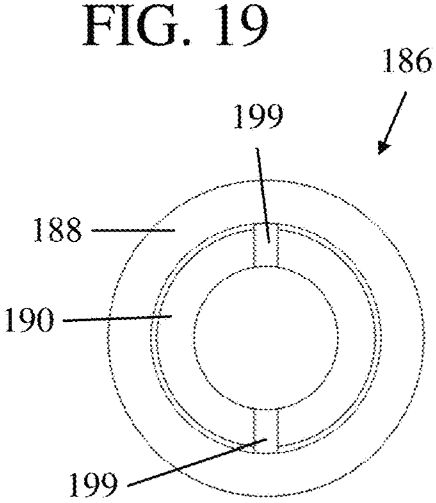
FIG. 19 is a back elevation view of the cap of the folding knife of FIG. 7.

As shown in FIGS. 18-19, the cap 186 can comprise an outer flange 188 and an inner sleeve 190. In some embodiments, the outer flange 188 and the inner sleeve 190 can be spaced apart by an annular groove 192. In other embodiments, the inner sleeve 190 can extend from the outer flange 188.

The outer flange 188 of the cap 186 can be configured cover the first post opening 138*a* of the second plate 130. In some embodiments, the second plate 130 can comprise a recess 194 configured to receive the outer flange 188 of the cap 186, as shown in FIG. 12. In this manner, the outer flange 188 of the cap 186 can be flush or at least substantially flush with the outer surface of the second plate 130 (see FIGS. 7 and 9).

Returning to FIGS. 18-19, the inner sleeve 190 can be configured to extend into the first post opening 138*a* of the second plate 130. In some embodiments, a radially outwardly-facing surface 196 of the inner sleeve 190 can comprise threads (not shown) configured to mate with corresponding threads on a radially inwardly-facing surface 198 of the second plate 130. In some embodiments, inner sleeve 190 has a notch 199. The notch 199 can be configured to assist in rotation of the cap 186 (e.g., when rotating the cap 186 relative to the second plate 130 to couple or remove the cap 186 from the second plate 130). In addition or as an alternative to threads, the cap 186 can be coupled to the second plate, for example, by friction (e.g., press-fit) and/or adhesive.

In some embodiments, the inner diameter of the inner sleeve 190 can be configured to be just slightly larger than the outside diameter of the head portion 121 of the first engaging post 112*a*. Thus, the head portion of 121 of the first engaging post 112*a* can extend into the inner sleeve 190 (see FIG. 20), and the inner sleeve 190 can provide support to the engaging post 112*a*. In this manner, the inner sleeve 190 can help to reduce relative movement (e.g., play) between the engaging post 112*a* and the second side portion 102*b* of the handle 102.

In some embodiments, the cap 186 can be formed of a relatively hard material (e.g., steel, titanium, etc.), and the handle 102 can be formed of a softer material (e.g., aluminum, polymers, composites, etc.). Forming the cap from relatively hard materials can help to reduce wear (e.g., wallowing) on the inner sleeve of the cap, which can be caused by contact with engaging post (because the engaging post can, in some embodiments be formed of a relatively hard material). Thus, forming the cap in this manner can help to maintain a solid connection and/or reduce play between the engaging post and the inner sleeve.

In some embodiments, the folding knife 100 can comprise an insert configured for receiving the head portion 121 of the first engaging post 112*a*. The insert can be configured similar to the inner sleeve 190 of the cap 186. The insert can be coupled to and/or extend from the inner surface of the second side portion 102*a* of the handle 102. In such embodiments, the second side portion 102*b* of the handle 102 can be formed without the first post opening 138*a* or such the first post opening 138*a* is a bore extending from the inner side of the second side portion of the handle but does not extend completely therethrough.

Referring again to FIGS. 10A-10B, the second side portion 102*b* of the handle 102 can be assembled by inserting the switch 132 into the switch opening 140 of the second plate 130 such that the actuation projection 156 (FIG. 14) of the switch 132 is exposed on the outer side of the second plate 130 and such that the base portion 154 of the switch 132 is disposed within the switch recess 142 (FIG. 13) of the second plate 130. The engaging plate 134 can be coupled to the switch 132 by aligning the pivot opening 172 (FIG. 16) and the guide slot 174 (FIG. 16) of the engaging plate 134 with the pivot projection 160 (FIG. 15) and the guide projection 162 (FIG. 15) of the switch 132, respectively. The engaging plate 134 can be advanced into the engaging plate recess 144 (FIG. 13) of the second plate 130 (see FIG. 24A). Although not shown, a spring and a ball can be inserted into the bores 164, 166 (FIG. 15) of the switch 132. The third plate 136 can then be coupled to the second plate 130 to secure the switch 132 and the engaging plate 134 to the second plate 130. This is accomplished by aligning the post openings 178 of the third plate 136 with the post openings 138 of the second plate 130, positioning the third plate 136 within the third plate recess 146 (FIG. 13) of the second plate 130, and inserting the third fasteners 152 into the connection openings 150, 180 of the second and third plates 130, 136.

In some embodiments, the second side portion 102*b* of the handle 102 can further include a bushing 103, as shown in FIG. 12. The bushing 103 can be inserted into the first post opening 178*a* of the third plate 136, as shown FIGS. 10B and 20.

When the first side portion 102*a* and the second side portion 102*b* are each assembled as shown in FIGS. 10A-10B, the folding knife 100 comprises three main components: the first side portion 102*a* of the handle 102, the second side portion 102*b* of the handle 102, and the blade 104. These three components can be quickly and easily connected together to form the assembled configuration of the folding knife 100.

Assembly and disassembly of the folding knife 100 are controlled by the switch 132 which in turn controls the positioning of the engaging plate 134. FIGS. 22A-24C show the various positions of the switch 132 and engaging plate 134 used in the assembly and disassembly processes. The position of the switch 132 shown in FIG. 22A corresponds to the position of the switch 132 and the engaging plate 134 shown in FIGS. 23A and 24A, the position of the switch 132 shown in FIG. 22B corresponds to the position of the switch 132 and the engaging plate 134 shown in FIGS. 23B and 24B, and the position of the switch 132 shown in FIG. 22C corresponds to the position of the switch 132 and the engaging plate 134 shown in FIGS. 23C and 24C.

Beginning from the disassembled configuration shown in FIGS. 10A-10B, the folding knife 100 can be assembled by aligning a pivot opening 105 and a guide opening 107 of the blade 104 with the first engaging post 112*a* and the blade guide pin 120 of the first side portion 102*a* of the handle 102, respectively. The blade 104 can then be advanced onto the first engaging post 112*a* such that the head portion 121 and the neck portion 123 of the first engaging post 112*a* extend through and past the blade 104. The blade guide pin 120 also protrudes past the blade 104.

Figure 22A:
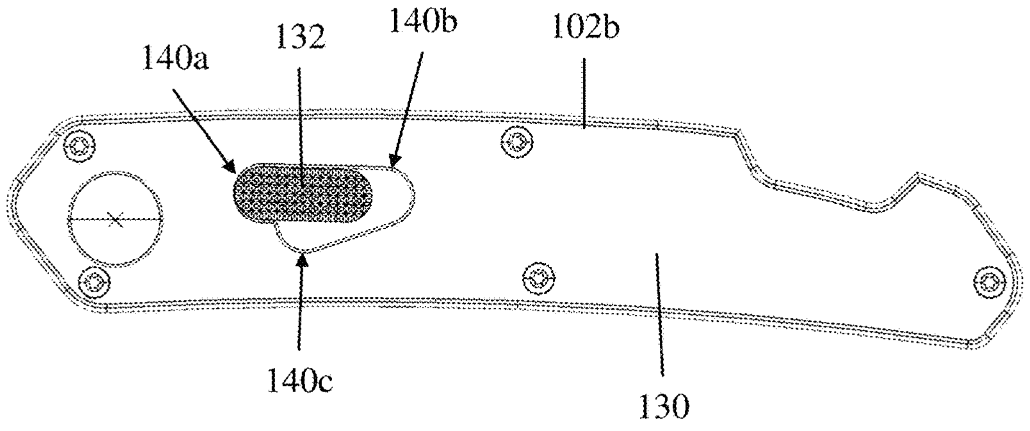
FIGS. 22A-22C are side elevation views of the first side of the handle of the folding knife of FIG. 7, showing an outer side of the handle and the switch of the folding knife in various positions.
Figure 23A:
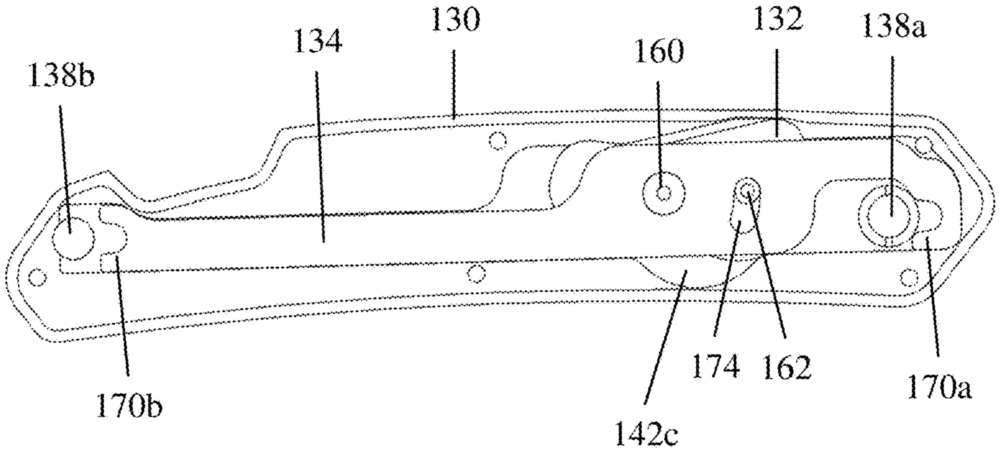
FIGS. 23A-23C are side elevation views of the first side of the handle of the folding knife of FIG. 7, showing an inner side of the handle and the switch of the folding knife in various positions.
Figure 23B:
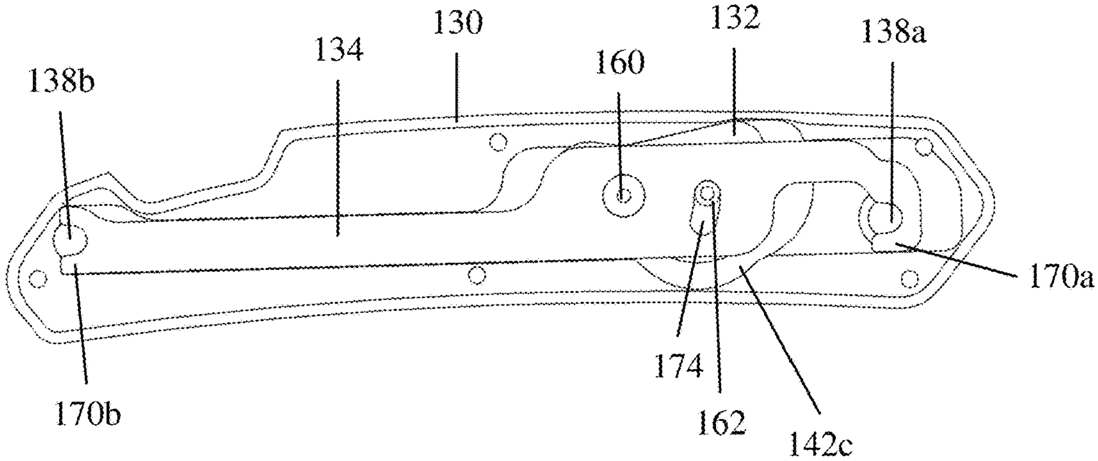

The second side portion 102*b* can be positioned onto the blade 104 and to the first side portion 102*a* by positioning the switch 132 of the second side portion 102*b* in an unlocked position, as shown in FIG. 22A. When the switch 132 is in the unlocked position, the engaging plate 134 is positioned relative to the second plate 130 and the third plate 136 such that the engaging portions 170 of the engaging plate 134 do not obstruct the post openings 138 of the second plate 130 or the post openings 178 of the third plate 136, as shown in FIG. 23A. The third plate 136 is not shown in FIGS. 23A-23C to better illustrate the positioning of the switch 132 and the engaging plate 134 relative to the second plate 130. With the post openings 138, 178 unobstructed, the post openings 138, 178 of the second side portion 102*b* can be aligned with and advanced onto the engaging posts 112 of the first side portion 102*a*, as shown in FIG. 24A.

Although not shown, when the switch 132 is disposed in the unlocked position (FIG. 22A), the balls of the biasing mechanism can be partially exposed from the bores 164, 166 (FIG. 15) of the switch 132 and protrude partially into one or more of the positioning holes 184 (FIG. 17) of the third plate 136. Specifically, a first ball disposed within the bore 164 of the switch 132 is disposed within the second positioning hole 184*b* of the third plate 136, and a second ball disposed within the bore 166 is positioned beyond the first positioning hole 184*a* of the third plate 136 toward the first post opening 178*a*. Despite the second ball not being disposed in a positioning hole, the switch 132 is restrained against pivoting relative to the second plate 130 (and the engaging plate 134) about the pivot projection 160 until acted upon by a user because the actuation projection 156 (FIG. 14) of the switch 132 is constrained by the portion of the second plate 130 that defines the first segment 140*a* of the switch opening 140.

Figure 20:
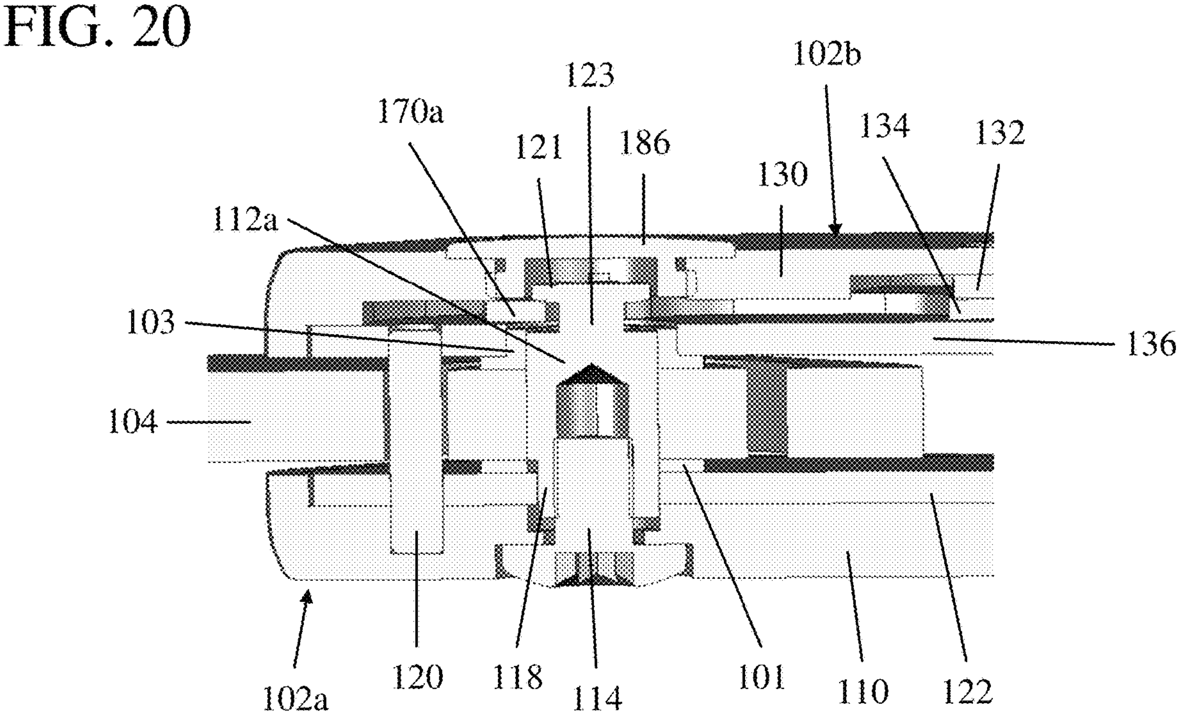
FIG. 20 is a partial cross-sectional view of a front portion of the folding knife of FIG. 7, taken along the line 20-20 shown in FIG. 7.
Figure 21:
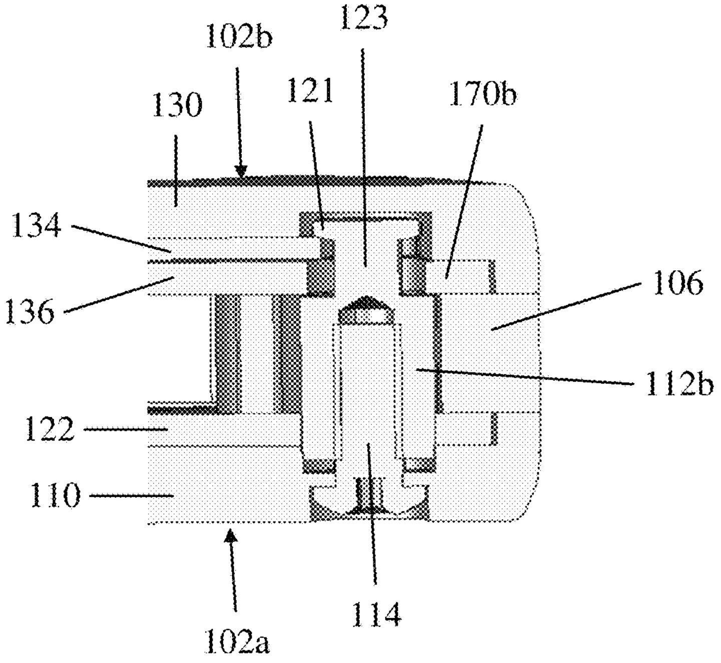
FIG. 21 is a partial cross-sectional view of a back portion of the folding knife of FIG. 7, taken along the line 21-21 shown in FIG. 8.
Figure 22B:
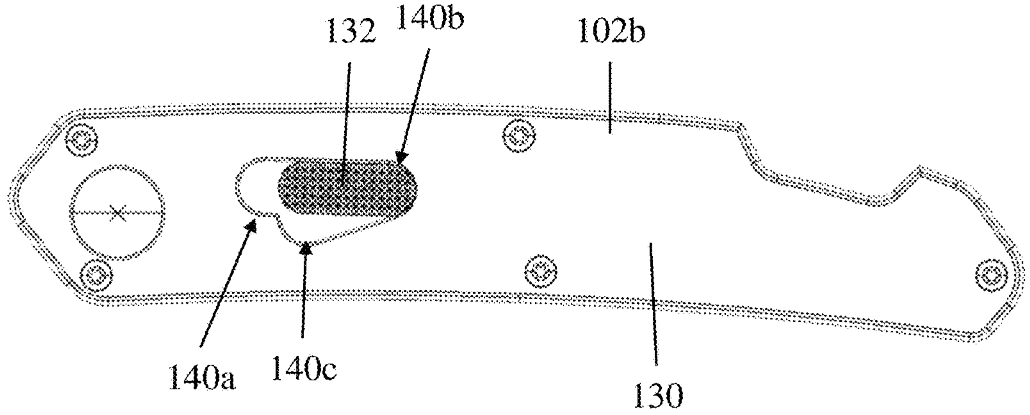

The second side portion 102*b* can be releasably secured relative to the blade 104 and to the first side portion 102*a* by moving the switch 132 from the unlocked position (FIG. 22A) to an engaged position (FIG. 22B). When the switch 132 moves from the unlocked position to the engaged position, the engaging portions 170 of the engaging plate 134 move into contact with the engaging posts 112 of the first side portion 102*a* as shown in FIG. 24B. More specifically, the engaging portions 170 of the engaging plate 134 extend partially around the neck portions 123 of the engaging posts 112 and contact the head portions 121 of the engaging posts 112, as shown in FIGS. 20-21. In this manner, the engaging plate 134 secures the engaging posts 112 of the first side portion 102*a* within the post openings 138 of the second side portion 102*b*. As a result, the first and second side portions 102*a*, 102*b* of the handle cannot be separated, and the blade 104 is secured between the first and second side portions 102*a*, 102*b* of the handle.

Although not shown, when the switch 132 is in the engaged position (FIG. 22B), the first ball disposed within the bore 164 of the switch 132 is disposed within the third positioning hole 184*c* of the third plate 136, and a second ball disposed within the bore 166 is positioned within the first positioning hole 184*a* of the third plate 136. As such, the biasing mechanism can help retain the switch 132 in the engaged position and reduce the likelihood that the switch 132 will be inadvertently moved from the engaged position (FIG. 22B) to the unlocked position (FIG. 22A). The biasing mechanism together with the positioning holes of the third plate are also referred to herein as "restricting elements" because they restrict movement of the switch.

Figure 22C:
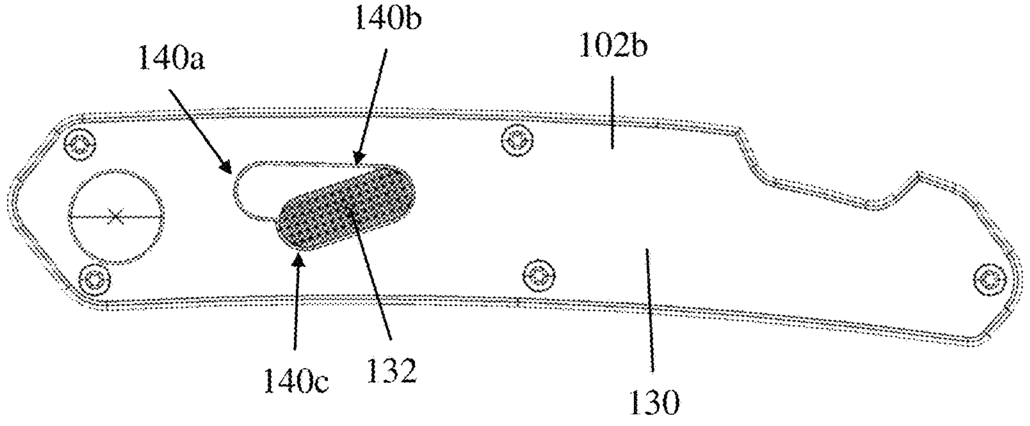

To further reduce the likelihood that the switch 132 will be inadvertently moved to the unlocked position (FIG. 22A), the switch 132 can be moved from the engaged position (FIG. 22B) to a locked position (FIG. 22C). This is accomplished by pivoting the switch 132 relative to the second plate 130 and the engaging plate 134 about the pivot projection 160 (FIG. 23B) of the switch 132. As the switch 132 pivots in this manner, the guide projection 162 of the switch 132 traverses the guide slot 174 of the engaging plate 134, as in FIGS. 23B-23C. As shown in FIGS. 24B and 24C, the engaging portions 170 of the engaging plate 134 remain in contact with the engaging posts 112 when the switch 132 is in both the engaged position (FIG. 24B) and the locked position (FIG. 24C).

Figure 23C:
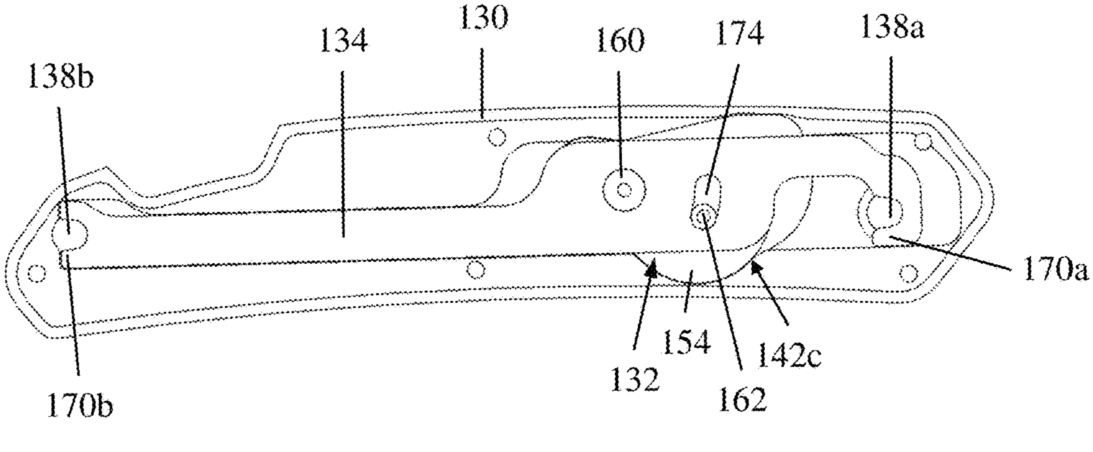
Figure 24C:
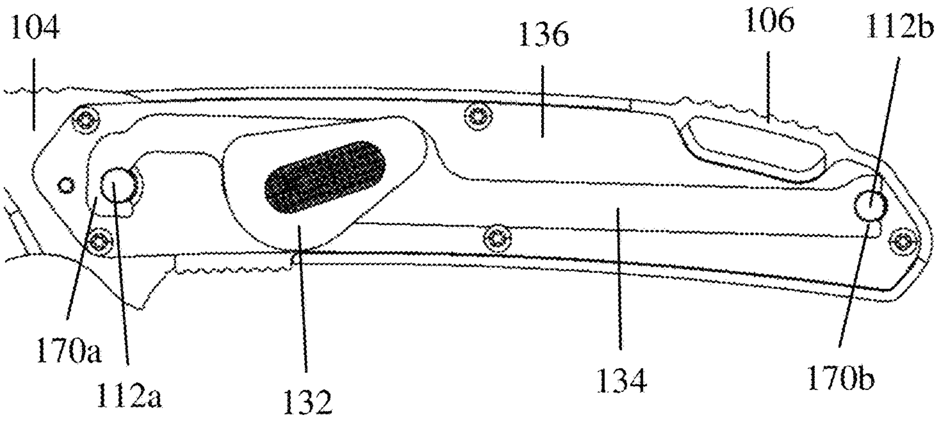

Referring to FIG. 23C, the switch 132 is prevented from moving longitudinally relative to the second plate 130 when the switch 132 is in the locked position because the base portion 154 of the switch 132 is constrained in the longitudinal direction by the portion of the second plate 130 that defines the third segment 142*c* of the switch recess 142. In this manner, the switch recess can also be referred to as a "restricting element" because it restricts movement of the switch. Thus, the switch 132 cannot move directly from the locked position to the unlocked position. Further, in the locked position, the first ball disposed within the bore 164 of the switch 132 is disposed within the third positioning hole 184*c* of the third plate 136, and a second ball disposed within the bore 166 is positioned within the fourth positioning hole 184*d* of the third plate 136. As such, the biasing mechanism can help retain the switch 132 in the locked position and reduce the likelihood that the switch 132 will be inadvertently moved from the locked position (FIG. 22C) to the engaged position (FIG. 22B).

Therefore, the folding knife 100 comprises an added level of safety to prevent inadvertent disassembly compared to the folding knife 200 because the switch 132 of the knife 100 has to be pivoted from the locked position (FIG. 22C) to the engaged position (FIG. 22B) and then slid longitudinally from the engaged position (FIG. 22B) to the unlocked position (FIG. 22A) for the folding knife 100 to be disassembled. By requiring a plurality of movements (e.g., pivoting and sliding), it is less likely that the switch will be inadvertently moved to the locked position to the unlocked position when the knife is being used (e.g., held in a user's hand), being stored (e.g., in a pocket or bag), or dropped.

In some embodiments, the folding knife 100 may have additional or alternative safety mechanisms such as a biasing element (e.g., a spring) configured to bias the switch 132 to the locked position and/or the engaged position.

Although the folding knife 100 has additional safety features, the folding knife 100 remains quick and easy to assemble and disassemble.

In other embodiments, rather than pivoting to move the switch between the locked position and the engaged position, the switch, the engaging plate, and/or the second plate can be configured such that the switch translates in a first direction (e.g., vertically). The switch, the engaging plate, and/or the second plate can also be configured such that the switch translates in a second direction (e.g., longitudinally) to move the switch between the engaged position and the unlocked position.

In some embodiments, a knife can comprise an engaging plate with only one engaging portion. For example, the engaging plate can be movable by a switch or other type of actuator (e.g., lever, button, etc.), and the engaging portion can engage one engaging post at one end of the knife (e.g., an engaging post extending through the blade at the front end of the knife). In such embodiments, the back end of the knife can be coupled together in various other ways. For example, the knife can comprise one or more additional engaging plates and actuators. As another example, the back end of the knife can be coupled together with a thumbwheel or other type of coupling mechanism. Examples of a thumbwheel and other types of coupling mechanisms are described, for example, in U.S. Publication No. 2017/0334077, now U.S. Pat. No. 10,654,180, and U.S. application Ser. No. 16/380,641, now U.S. Pat. No. 10,882,197, which are both incorporated by reference herein.

Figure 25:
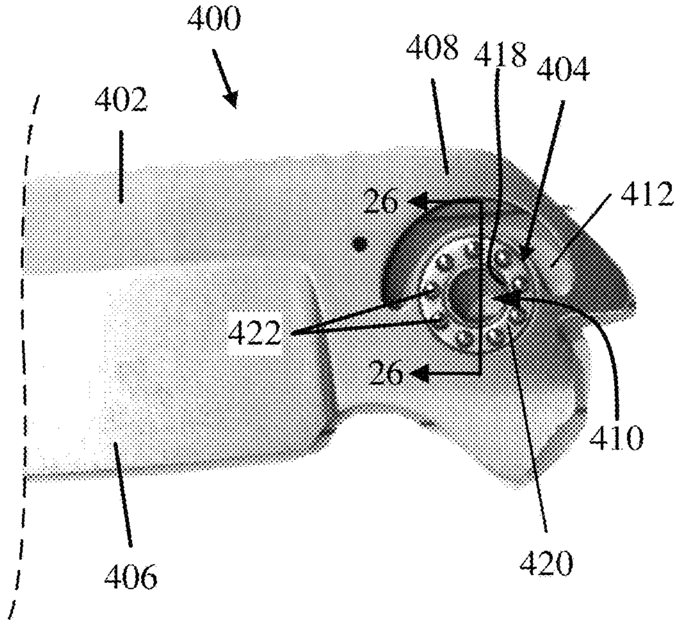
FIG. 25 is a partial side elevation view of a blade assembly for a folding knife.

FIG. 25 shows a portion of a blade assembly 400 according to one embodiment. The blade assembly can be used, for example, with the folding knifes 100, 200 in lieu of the blades 104, 20A, respectively. The blade assembly 400 can comprise a blade 402 and a bearing assembly 404. As further explained below, the bearing assembly 404 is secured within the blade 402 such that the bearing assembly 404 does not separate from the blade 402 when the knife is disassembled into the three main components (i.e., a first handle portion, a second handle portion, and the blade assembly) (see, e.g., FIGS. 10A-10B).

The bearing assembly 404 can, for example, reduce friction between the blade 402 and the interior surfaces of the handle as the blade 402 pivots relative to the handle between the open and closed configurations. The bearing assembly 404 can also increase lateral stability of the blade 402 (and thus reduce play) relative to the handle because the bearing assembly 404 contacts the side portions of the handle.

The blade 402 of the blade assembly 400 can comprise a distal or a cutting portion 406 (only partially shown in FIG. 25) and a proximal or tang portion 408. The tang portion 408 of blade 402 can configured for pivotably coupling the blade 402 to a handle. For example, the tang portion 408 of the blade can comprise a pivot opening 410 and a guide pin slot 412. The pivot opening 410 can be configured to receive an engaging post of a handle (e.g., the engaging post 112*a*), and the guide pin slot 412 can be configured for receiving a guide pin of a handle (e.g., the blade guide pin 120).

Figure 26:
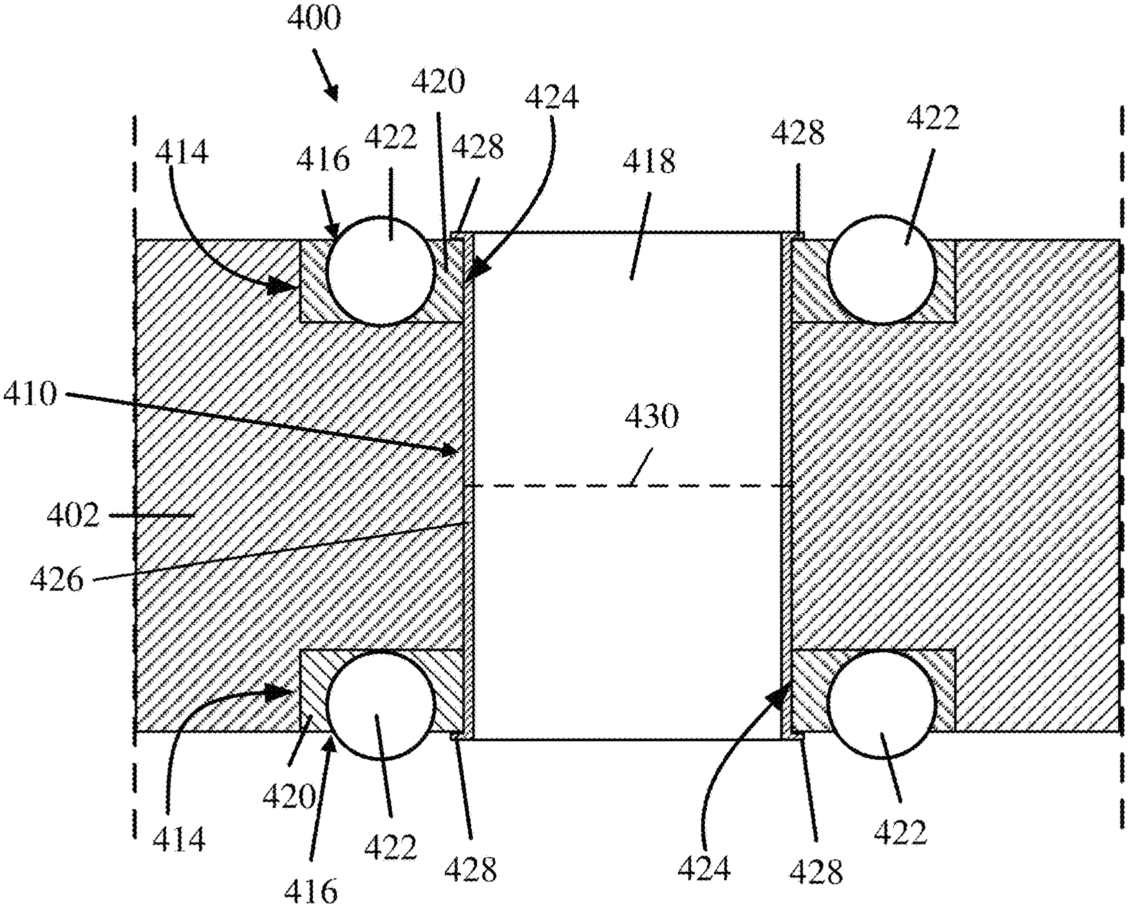
FIG. 26 is a partial cross-sectional view of the blade assembly of FIG. 25, taken along the line 26-26 shown in FIG. 25.

Referring now to FIG. 26, the tang portion 408 of the blade 402 can further comprise one or more recessed portions 414 configured for receiving the bearing assembly 404. For example, in the illustrated embodiment the blade 402 comprises two recessed portions 414 (i.e., one recessed portion 414 on each side of the blade 402). In other embodiments, a blade can comprise one recessed portion.

The recessed portions 414 of the blade 402 can extend laterally (i.e., vertically in the orientation depicted in FIG. 26) inwardly from the outer side surface of the blade and radially (i.e., horizontally in the orientation depicted in FIG. 26) outwardly from the pivot opening 410.

The bearing assembly 404 of the blade assembly 400 can comprise one or more bearing members 416 (e.g., two in the illustrated embodiment, i.e., one on each side of the blade) and a sleeve 418. The bearing members 416 can be disposed within a respective recessed portion 414 of the blade 402. The sleeve 418 can be configured to retain the bearing members 416 within the recessed portions 414 of the blade 402.

Each bearing member 416 can comprise a race 420 and a plurality of balls 422 rotatably coupled to the race 420. The race 420 of each bearing member 416 can comprise a central opening 424 aligned with the pivot opening 410 of the blade 402 and configured for receiving the sleeve 418. Each race 420 can also comprise a plurality of ball openings (not shown) configured to allow the balls 422 to rotate relative to the race 420 and to restrict lateral movement of the balls 422. The balls 422 of the bearing members 416 can be disposed in respective ball openings of a race 420 and configured to contact and roll relative to side portions of a handle, the race 420, and/or the blade 402.

The sleeve 418 of the bearing assembly 404 can comprise a cylindrical main portion 426 and flange portions 428. The main portion 426 of the sleeve 418 can extend through the central openings 424 of the bearing members 416 and through the pivot opening 410 of the blade 402. The flange portions 428 of the sleeve 418 extend radially outwardly relative to the main portion 426 and radially overlap the races 420 of the bearing members 416. In this manner, the flange portions 428 of the sleeve 418 retain the bearing members 416 within the recessed portions 414 of the blade 402, and thus prevent the bearing assembly 404 from separating from the blade 402 during typical disassembly. The opposing flange portions 428 of the sleeve 418 prevent the sleeve 418 from moving laterally relative to the blade 402 and the bearing members 416.

In some embodiments, the flange portions 428 of the sleeve 418 can be formed after the bearing assembly is partially assembled. In such embodiments, the bearing assembly 404 can be assembled by inserting the bearing member 416 into respective recessed portions 414 of the blade 402. A cylindrical sleeve similar to the sleeve 418 but without the flange portions 428 can then be inserted through the central openings 424 of the bearing members 416 and the pivot opening 410 of the blade 402. The end portions of the sleeve can then be deformed (e.g., bent) such that the end portions flare radially outwardly and extend over a portion of the races 420 of the bearing members 416, thereby forming the flange portions 428 of the sleeve 418.

In other embodiments, the flange portions 428 of the sleeve 418 can be formed prior assembly of the bearing assembly. In such embodiments, the sleeve 418 can be formed in two halves, each having a main portion 426 and one flange portion 428 (rather than two flange portions). For purposes of illustration, the two halves of the sleeve 418 are depicted in FIG. 26 as being separated by a broken line 430. In such embodiments, the bearing assembly 404 can be assembled by inserting the bearing member 416 into respective recessed portions 414 of the blade 402. The main portion 426 of each half of the sleeve 418 can be inserted through a central opening 424 of a respective bearing member 416 and into the pivot opening 410 of the blade 402. The main portion 426 of the two halves of the sleeve 418 can abut each other, or they can be spaced apart from each other. The sleeve 418 can be retained relative to the bearing members 416 and/or the blade 402 by frictional engagement between the sleeve 418 and the races 420 of the bearing members 416 and/or the blade 402. As such, the sleeve 418 can be press fit and/or expanded within the openings of the bearing members 416 and/or the blade 402 (e.g., with a mandrel) such that the outer radial surface of the main portion 426 of the sleeve 418 engages the inner radial surfaces of the races 420 and blade 402 that define the openings 424, 410, respectively.

In some embodiments, a knife can comprise one or more bearing assemblies mounted in the side portions of a handle. The bearing assemblies can be mounted within a recessed portion of the handle similar to the manner in which the bearing assembly 404 is mounted within the blade 402.

The structural features described herein, with regard to any example, can be used separately and/or combined with other structural features described in any one or more of the other examples. For example, one or more features of the folding knife 100 can be combined with any one or more features of the folding knife 200.

In view of the many possible embodiments to which the principles of the disclosure may be applied, it should be recognized that the illustrated embodiments are only examples and should not be taken as limiting the scope of the claims. Rather, the scope of the claimed subject matter is defined by the following claims and their equivalents.

The invention claimed is:

1. A blade assembly for a folding knife, comprising:

a blade comprising a cutting portion and a tang portion, wherein the tang portion comprises a pivot opening, a first recess, and a second recess; and a bearing assembly coupled to the blade, wherein the bearing assembly comprises a first bearing member, a second bearing member, and a sleeve, wherein the first bearing member is disposed within the first recess of the tang portion, wherein the second bearing member is disposed within the second recess of the tang portion, wherein the sleeve extends through the first bearing member, the second bearing member, and the pivot opening of the tang portion, wherein the sleeve comprises a first flange configured to engage the first bearing member and to retain the first bearing member within the first recess of the tang portion, and wherein the sleeve comprises a second flange configured to engage the second bearing member and to retain the second bearing member within the second recess of the tang portion.

2. The blade assembly of claim 1, the first bearing member and the second bearing member are each configured as a ball bearing member.

3. The blade assembly of claim 2, wherein each ball bearing member comprises a race and a plurality of balls, wherein the race comprises a central opening and a plurality of ball openings, wherein the central opening of the race is aligned with the pivot opening of the tang portion, and wherein the plurality of ball openings are spaced radially outwardly from and distributed circumferentially around the central opening, and wherein each ball of the plurality of balls is disposed in a respective ball opening of the plurality of ball openings.

4. The blade assembly of claim 1, wherein the sleeve comprises a unitary structure extending from the first flange to the second flange.

5. The blade assembly of claim 1, wherein the sleeve comprises a first side portion and a separate, second side portion, wherein the first side portion comprises the first flange, wherein the second side portion comprises the second flange.

6. A folding knife comprising:

the blade assembly of claim 1;

a handle comprising a first side portion and a second side portion, wherein the tang portion of the blade assembly is disposed between and pivotably coupled to the first side portion and the second side portion of the handle;

an actuation mechanism coupled to the handle and movable relative to the handle between an engaged configuration and a disengaged configuration, wherein in the engaged configuration, the actuation mechanism prevents relative movement between the first side portion of the handle and the second side portion of the handle in a first direction, and wherein in the disengaged configuration, the actuation mechanism allows relative movement between the first side portion of the handle and the second side portion of the handle in the first direction; and a switch coupled to the handle and the actuation mechanism, wherein the switch is configured such that moving the switch relative to the handle along a first path retains the actuation mechanism in the engaged configuration and such that moving the switch relative to the handle along a second path moves the actuation mechanism between the engaged configuration and the disengaged configuration.

7. The folding knife of claim 6, wherein the switch is pivotably coupled to the actuation mechanism.

8. The folding knife of claim 7, wherein the actuation mechanism comprises an engaging plate with a pivot opening formed therein, wherein the switch comprises a pivot projection configured to extend through the pivot opening of the engaging plate, and wherein the switch pivots relative to the engaging plate about the pivot projection when the switch is moved along the first path.

9. A blade assembly for a folding knife, comprising:
- a blade comprising a cutting portion and a tang portion, wherein the tang portion comprises a pivot opening, and a recess; and
- a bearing assembly coupled to the blade, wherein the bearing assembly comprises a bearing member and a sleeve, wherein the bearing member is disposed within the recess of the tang portion, wherein the sleeve extends through the bearing member and into the pivot opening of the tang portion, wherein the sleeve comprises a flange configured to engage the bearing member and to retain the bearing member within the recess of the tang portion.

10. The blade assembly of claim 9, the bearing member is configured as a ball bearing member.

11. The blade assembly of claim 10, wherein the ball bearing member comprises a race and a plurality of balls, wherein the race comprises a central opening and a plurality of ball openings, wherein the central opening of the race is aligned with the pivot opening of the tang portion, and wherein the plurality of ball openings are spaced radially outwardly from and distributed circumferentially around the central opening, and wherein each ball of the plurality of balls is disposed in a respective ball opening of the plurality of ball openings.

12. A folding knife comprising:
- the blade assembly of claim 9;
- a handle comprising a first side portion and a second side portion, wherein the tang portion of the blade assembly is disposed between and pivotably coupled to the first side portion and the second side portion of the handle;
- an actuation mechanism coupled to the handle and movable relative to the handle between an engaged configuration and a disengaged configuration, wherein in the engaged configuration, the actuation mechanism prevents relative movement between the first side portion of the handle and the second side portion of the handle in a first direction, and wherein in the disengaged configuration, the actuation mechanism allows relative movement between the first side portion of the handle and the second side portion of the handle in the first direction; and
- a switch coupled to the handle and the actuation mechanism, wherein the switch is configured such that moving the switch relative to the handle along a first path retains the actuation mechanism in the engaged configuration and such that moving the switch relative to the handle along a second path moves the actuation mechanism between the engaged configuration and the disengaged configuration.

13. The folding knife of claim 12, wherein the switch is pivotably coupled to the actuation mechanism.

14. The folding knife of claim 13, wherein the actuation mechanism comprises an engaging plate with a pivot opening formed therein, wherein the switch comprises a pivot projection configured to extend through the pivot opening of the engaging plate, and wherein the switch pivots relative to the engaging plate about the pivot projection when the switch is moved along the first path.

15. A blade assembly for a folding knife, comprising:
- a blade comprising a cutting portion and a tang portion, wherein the tang portion comprises a pivot opening and one or more recessed portions; and
- a bearing assembly coupled to the blade, wherein the bearing assembly comprises one or more bearing members and a sleeve, wherein the bearing members are disposed within the recessed portions of the blade, wherein the sleeve extends through the bearing members and through the pivot opening of the blade, and wherein the sleeve comprises one or more flange portions configured to engage the bearing members and to retain the bearing members within the recessed portions of the blade.

16. The blade assembly of claim 15, wherein the one or more recessed portions of the tang portion includes a first recessed portion and a second recessed portion, wherein the one or more bearing members of the bearing assembly includes a first bearing member and a second bearing member, wherein the first bearing member is disposed in the first recessed portion, and wherein the second bearing member is disposed in the second recessed portion.

17. The blade assembly of claim 16, wherein the one or more flange portions of the sleeve comprises a first flange portion and a second flange portion, wherein the first flange portion engages the first bearing member and retains the first bearing member in the first recessed portion, and wherein the second flange portion engages the second bearing member and retains the second bearing member in the second recessed portion.

18. The blade assembly of claim 15, wherein the one or more recessed portions are axially aligned with the pivot opening, and wherein the one or more recessed portions are disposed radially outwardly from the pivot opening.

19. A folding knife comprising:
- the blade assembly of claim 15; and
- a handle comprising a first side portion and a second side portion, wherein the first side portion comprises an engaging post, and wherein the second side portion comprises an engaging member,
- wherein the blade assembly is pivotably coupled to the first side portion and the second side portion of the handle when the folding knife is in an assembled configuration, wherein the first side portion, the second side portion, and the blade assembly are separated from each other when the folding knife is in a disassembled configuration, and wherein the bearing assembly and the blade remain coupled together when the folding knife is in the disassembled configuration.

20. The folding knife of claim 19, wherein the engaging post of the handle extends through the sleeve of the bearing assembly.

* * * * *